United States Patent
Kriesel

[19]

[11] Patent Number: 5,906,703
[45] Date of Patent: May 25, 1999

[54] METHOD AND APPARATUS FOR MAKING FLUID DELIVERY DEVICE

[75] Inventor: Marshall S Kriesel, St. Paul, Minn.

[73] Assignee: Science Incorporated, Bloomington, Minn.

[21] Appl. No.: 08/769,654

[22] Filed: Dec. 19, 1996

[51] Int. Cl.[6] .............................. B32B 31/04; B32B 31/20
[52] U.S. Cl. ...................... 156/275.1; 156/290; 156/292; 156/145
[58] Field of Search .................................. 156/292, 145, 156/146, 147, 290, 275.1

[56] References Cited

U.S. PATENT DOCUMENTS

| | | | |
|---|---|---|---|
| 3,086,899 | 4/1963 | Smith et al. | 156/292 |
| 3,193,434 | 7/1965 | Weiss | 156/292 |
| 3,496,043 | 2/1970 | Ragan | 156/292 |
| 4,152,098 | 5/1979 | Moody et al. | 604/103 X |
| 4,564,407 | 1/1986 | Tsuruta | 156/292 |
| 4,637,103 | 1/1987 | Hutzenlaub | 26/73 |
| 4,718,958 | 1/1988 | Kugelmann, Sr. | 156/292 |
| 4,748,796 | 6/1988 | Viel | 156/292 |
| 4,815,181 | 3/1989 | Dornier et al. | 26/91 |
| 4,941,936 | 7/1990 | Wilkinson et al. | 156/292 |
| 5,014,402 | 5/1991 | Cunningham | 26/91 |
| 5,304,271 | 4/1994 | Gusakov | 156/145 |
| 5,341,547 | 8/1994 | Rutz | 26/72 |
| 5,355,564 | 10/1994 | Gunter, Jr. et al. | 26/94 |

FOREIGN PATENT DOCUMENTS

3113283 C2  10/1982  Germany.

Primary Examiner—Rena L. Dye
Attorney, Agent, or Firm—James E. Brunton

[57] ABSTRACT

A method and apparatus for the high volume manufacture of fluid infusion devices which embody a self-contained, stored-energy source for expelling fluids from the reservoir of the device into an ambulatory patient at precisely controlled rates over extended periods of time. In accordance with the method of the invention, the base and cover infusion components of the devices of the invention are manufactured in injection molded arrays which comprise a cover array which is superimposed over and connected to a base array with the elastomeric membrane being captured therebetween. The elastomeric membrane material, which forms the stored-energy source of the infusion devices, is continuously unrolled from a large roll of film-backed membrane material which is rotatably mounted on a turret assembly upon which a second back-up roll of elastomeric membrane material is also mounted. After being unrolled, the film backing is separated from the membrane and the membrane is introduced into a novel tenter apparatus which controllably, biaxially stretches the membrane material. Following the stretching step, the membrane is automatically cut and then sealed between the cover components and base components of the cover and base arrays. The finished, individual infusion devices are then separated from the arrays and automatically packaged for shipping.

9 Claims, 28 Drawing Sheets

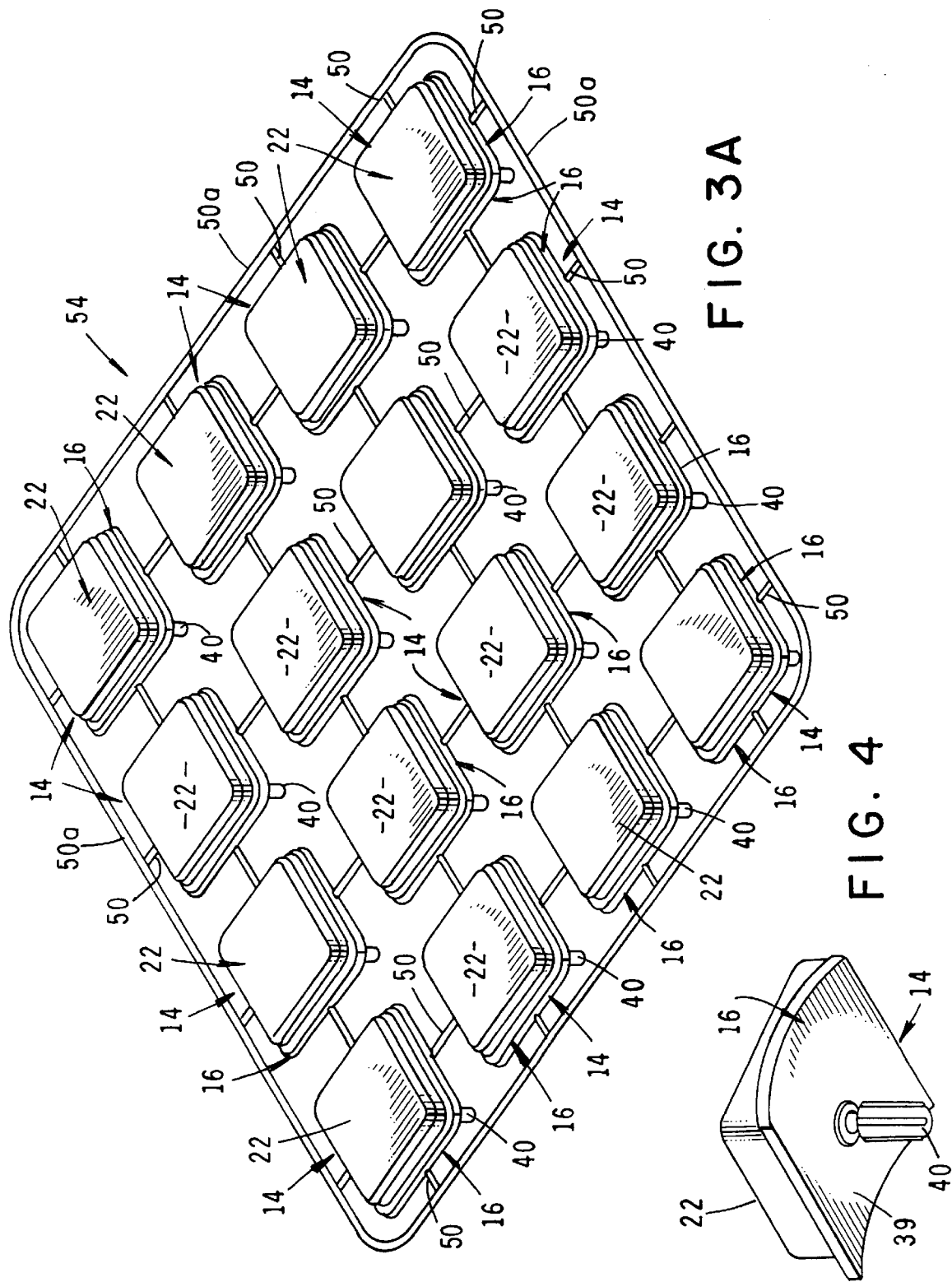

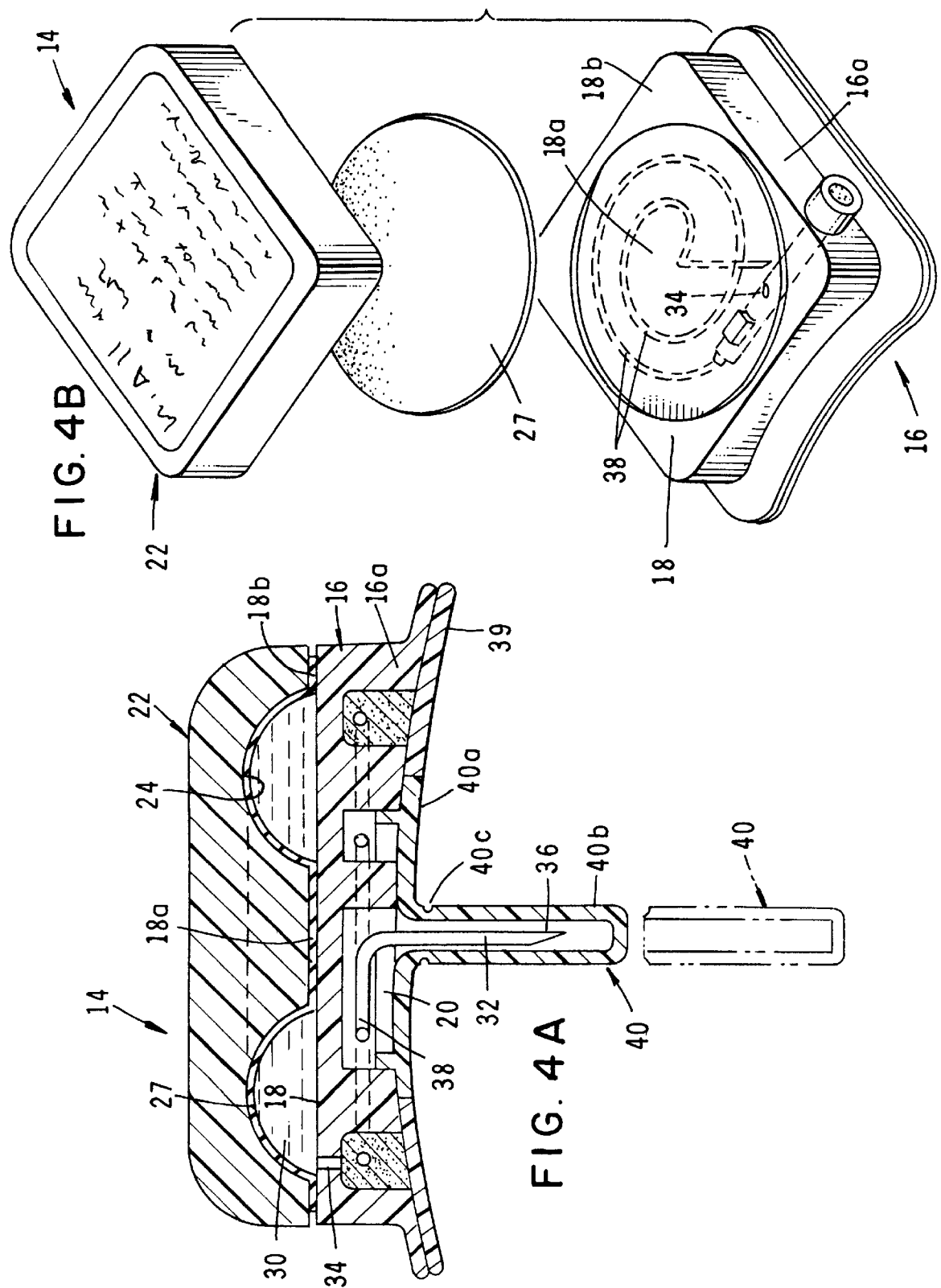

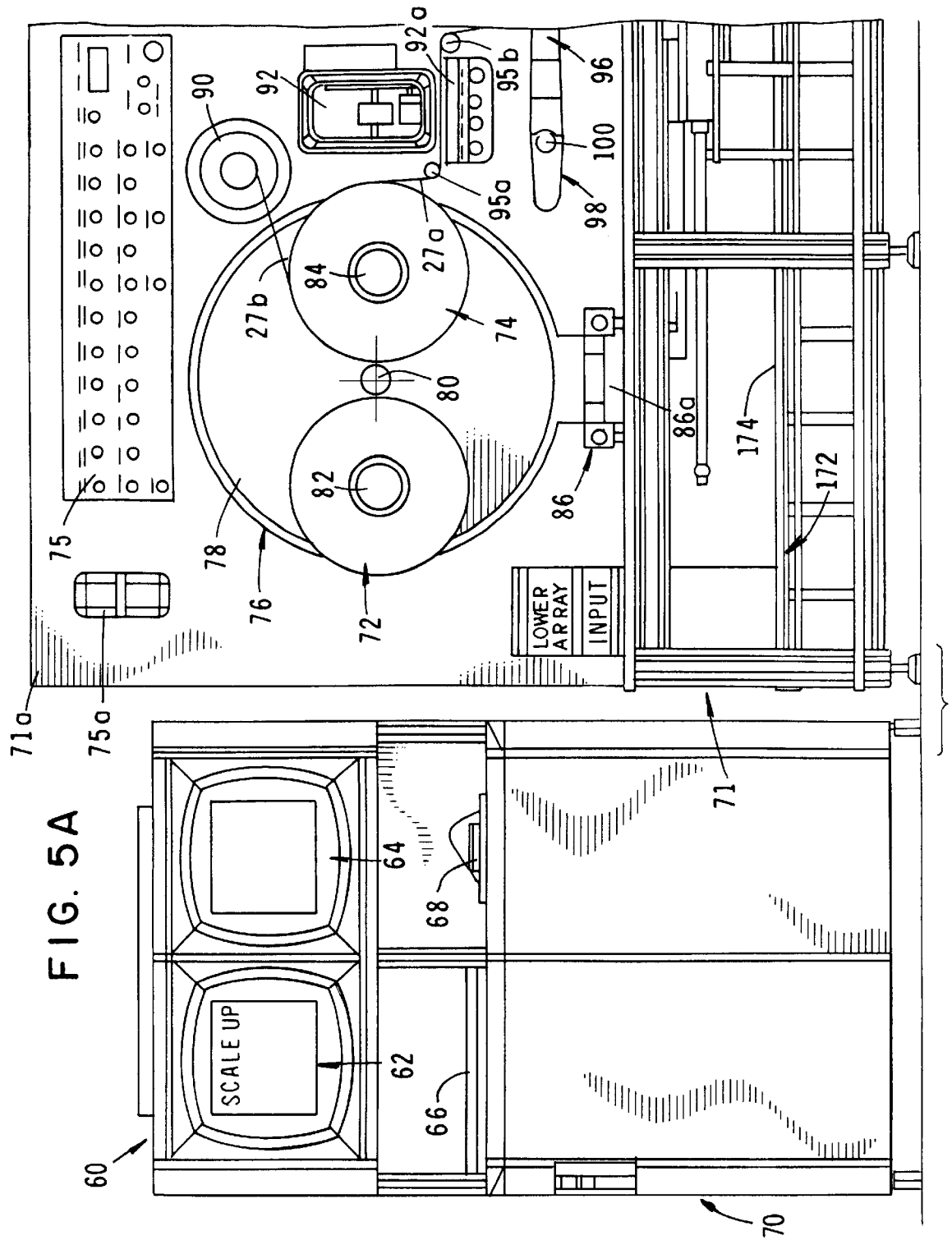

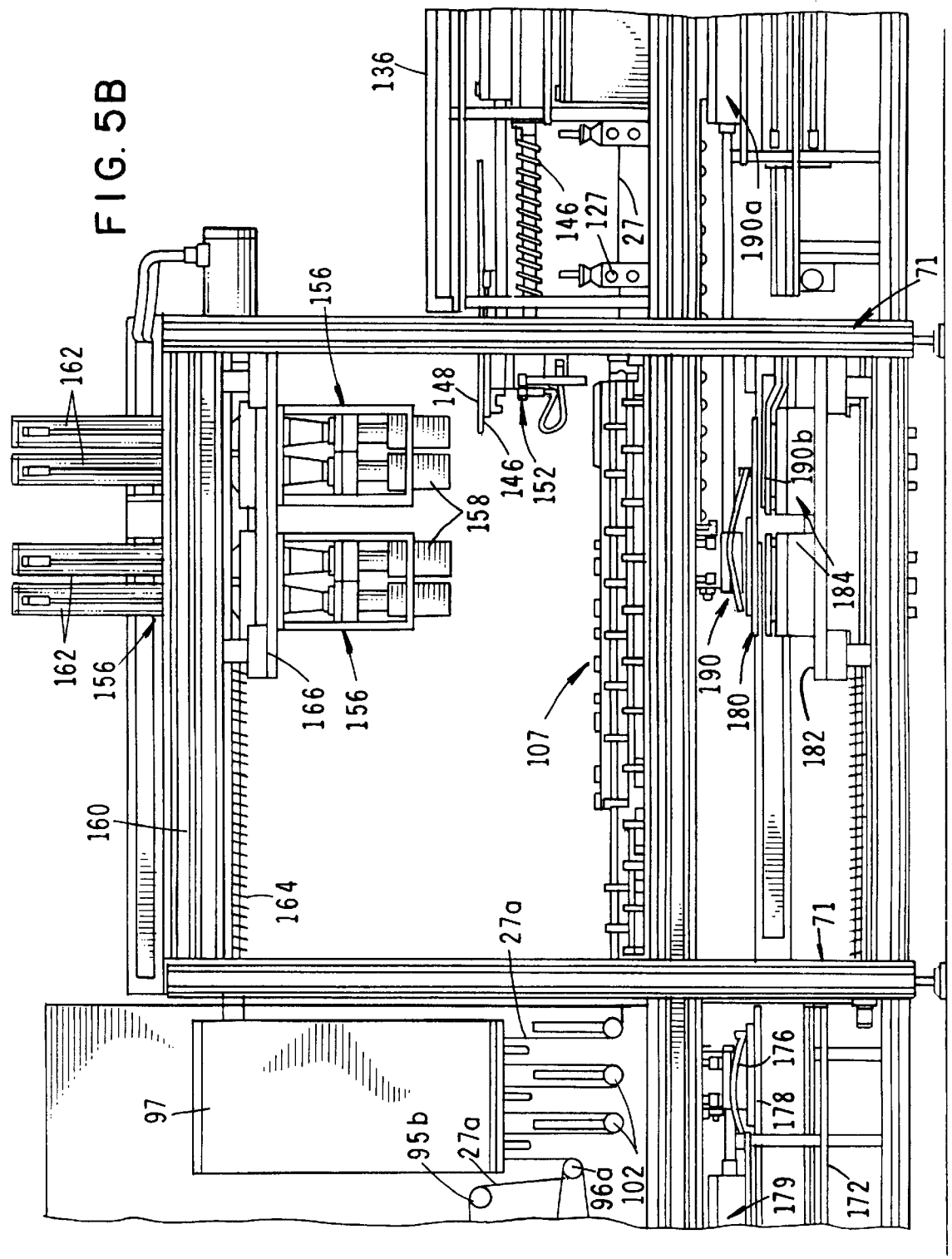

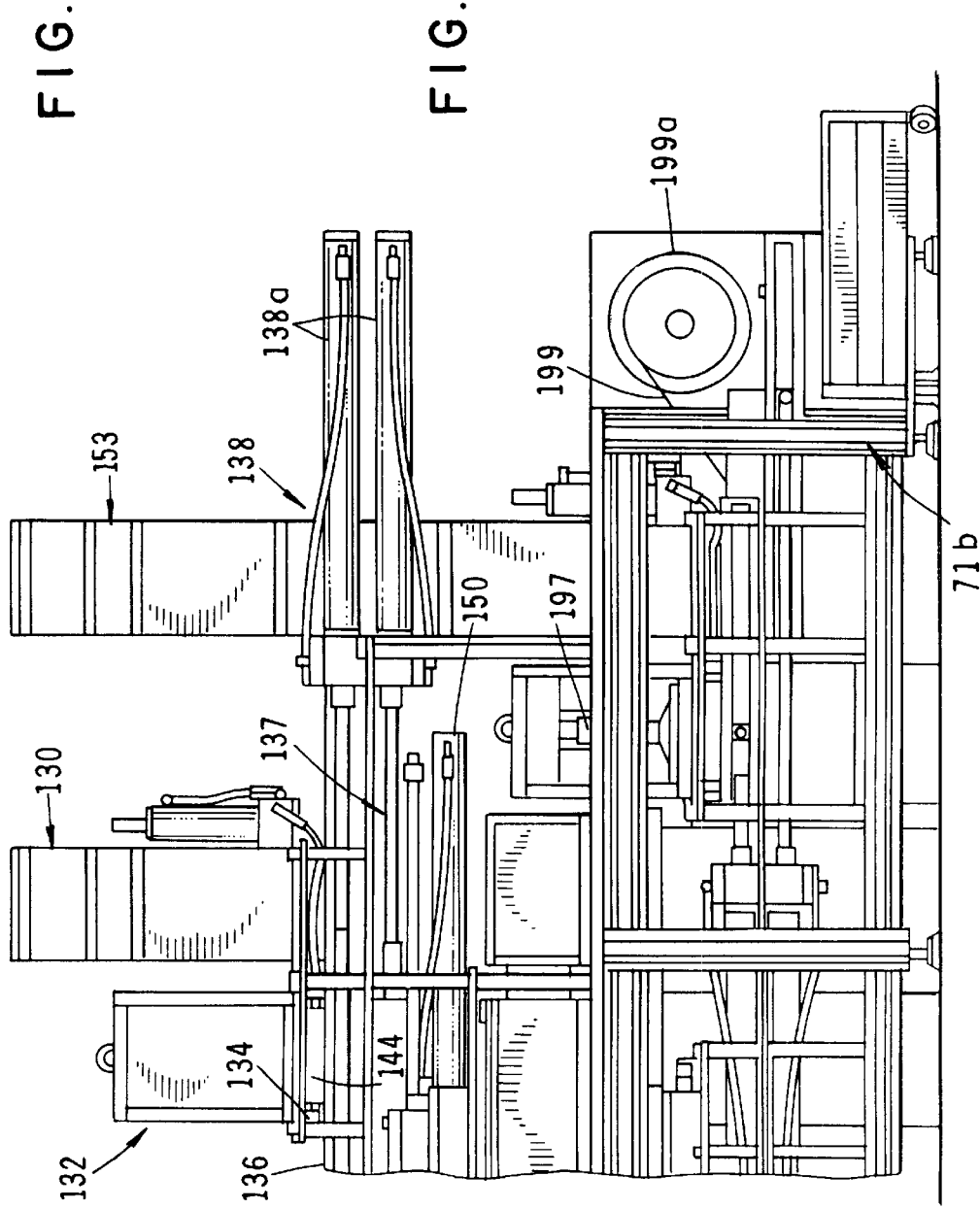

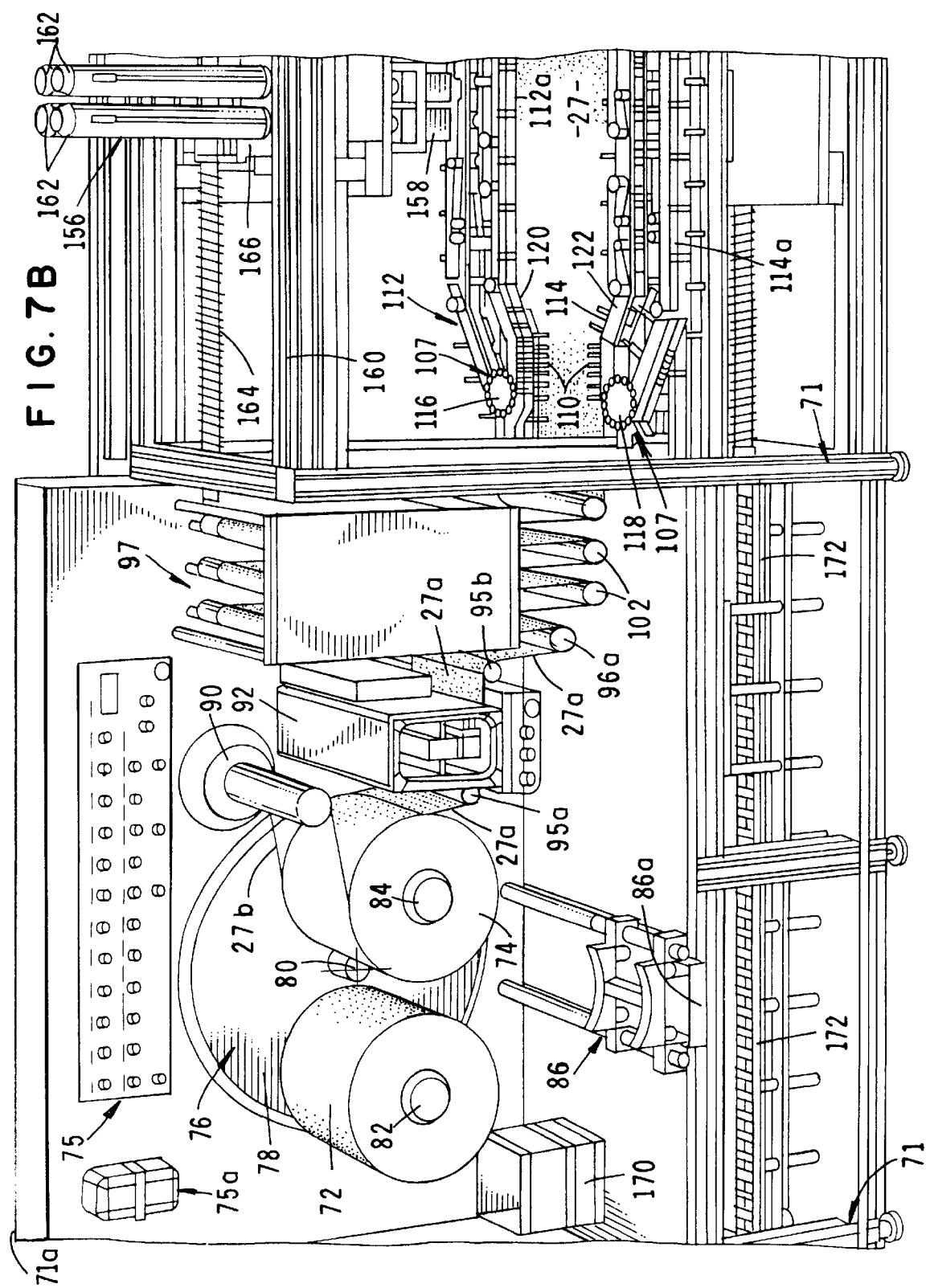

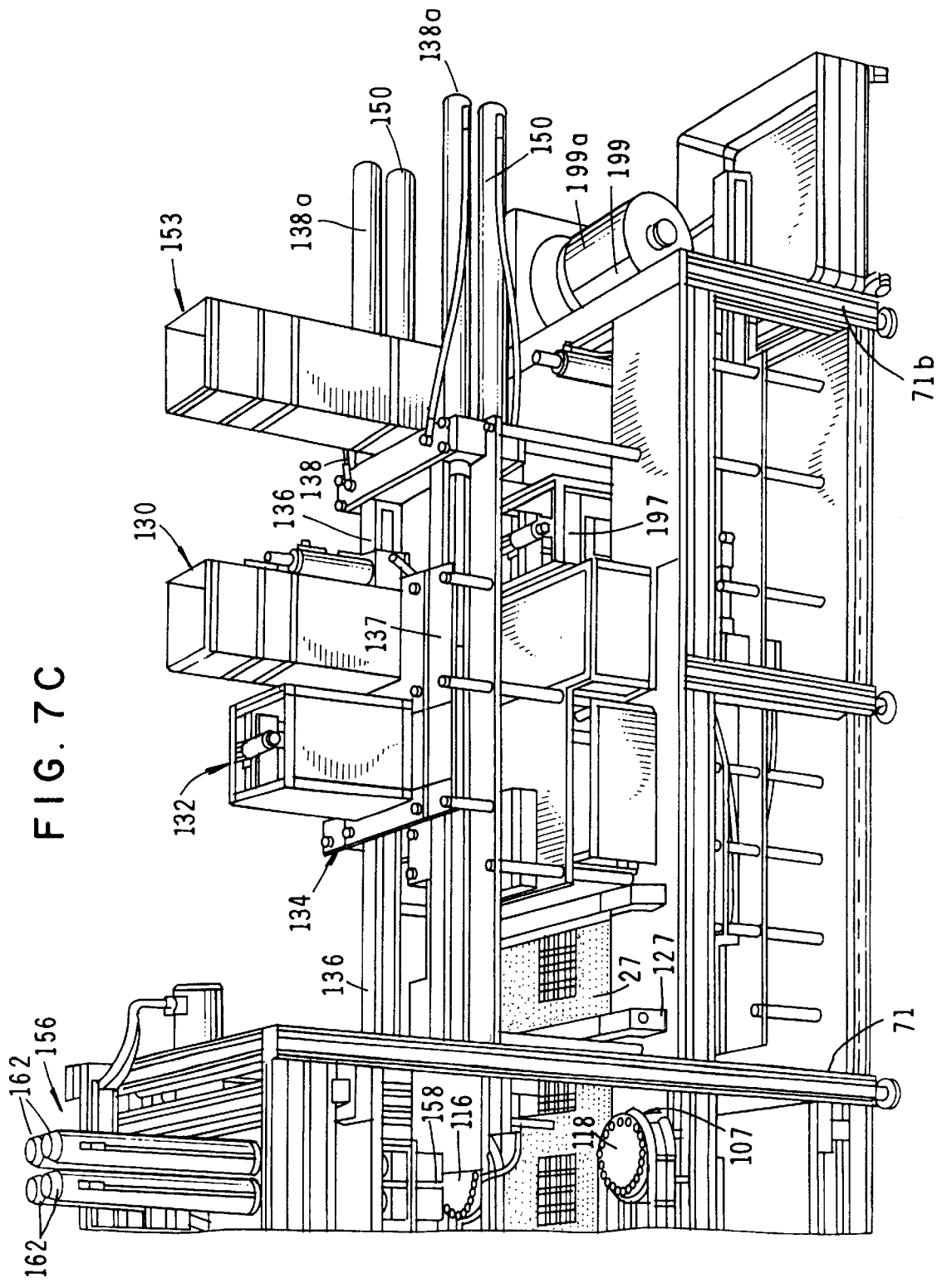

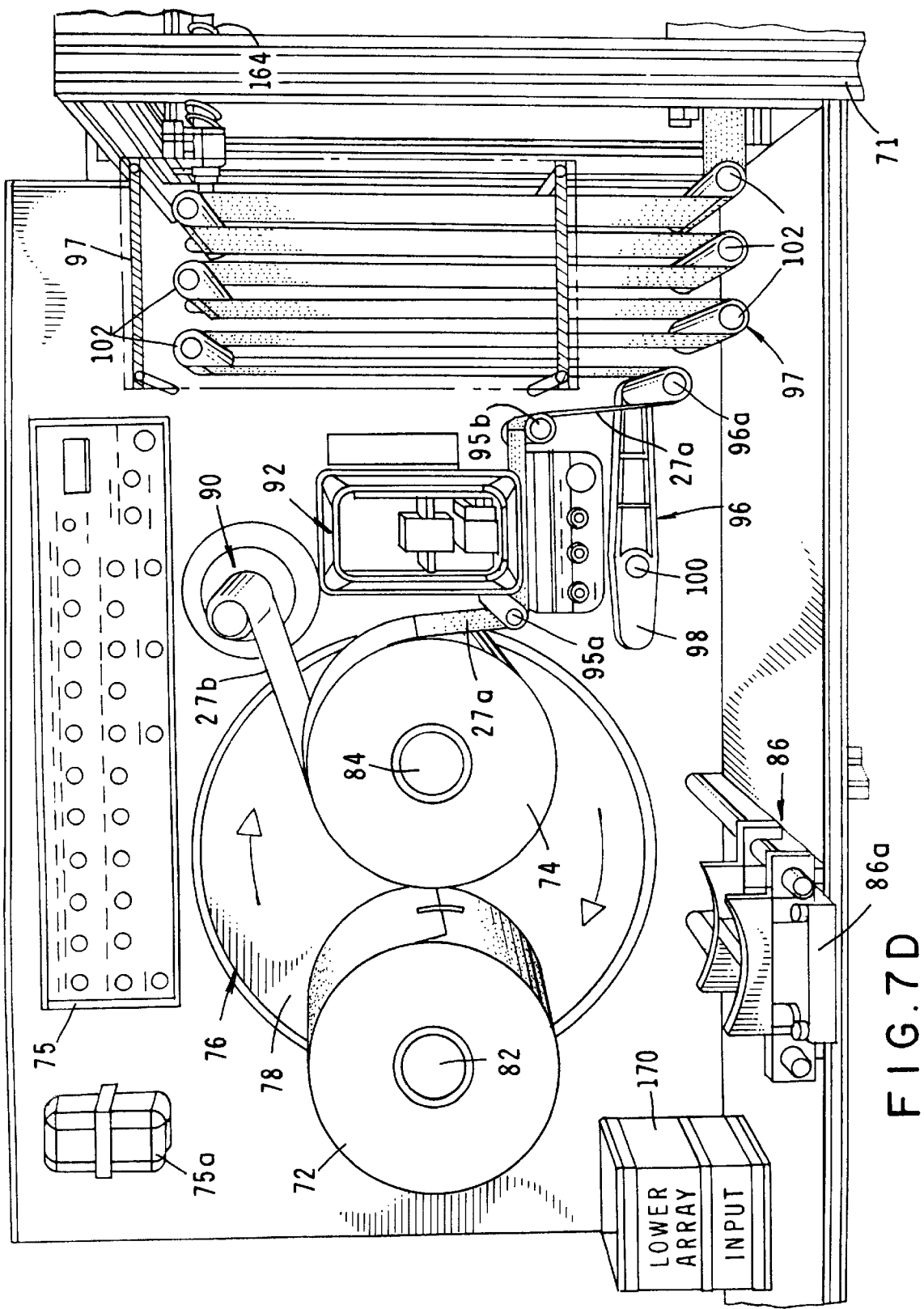

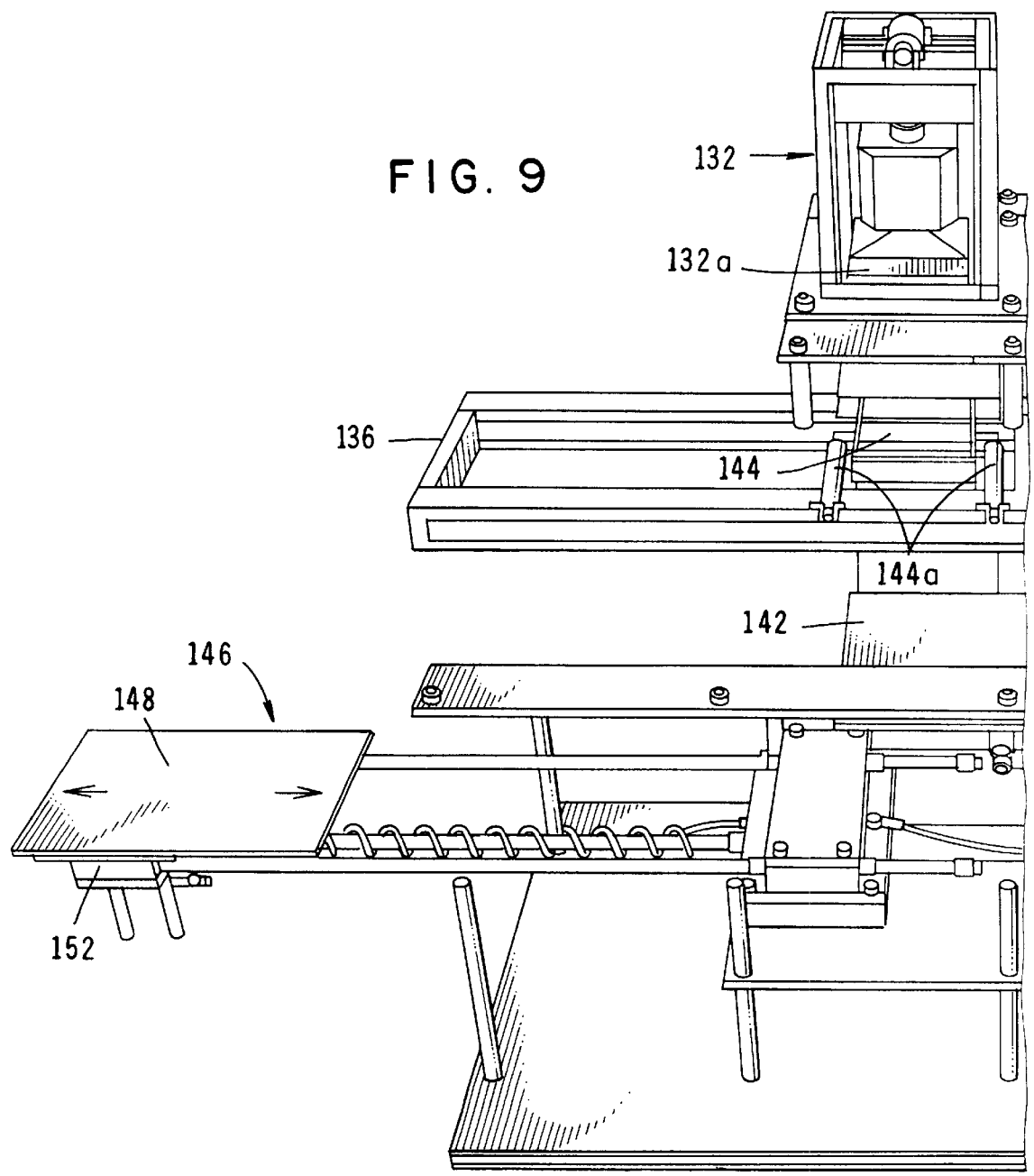

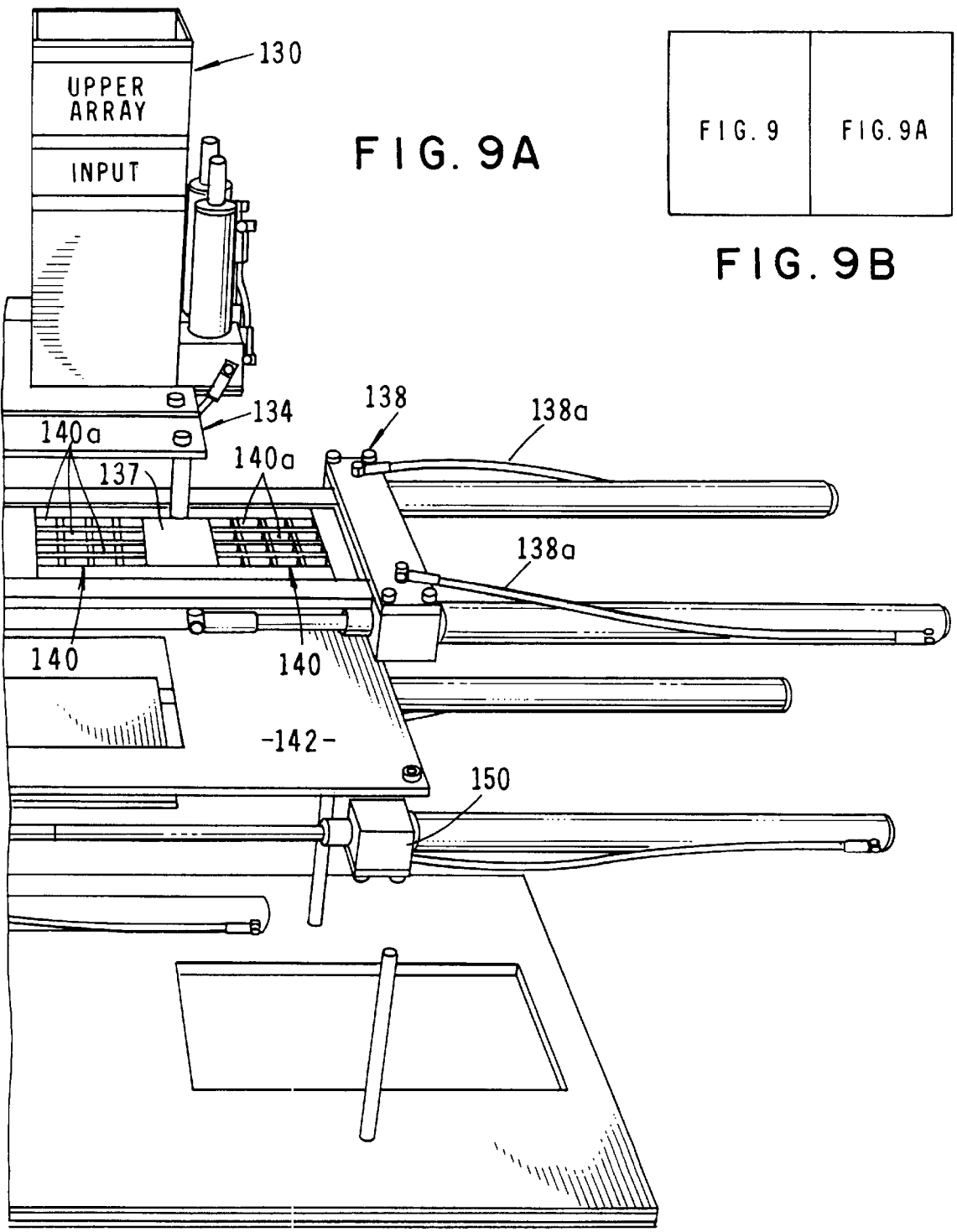

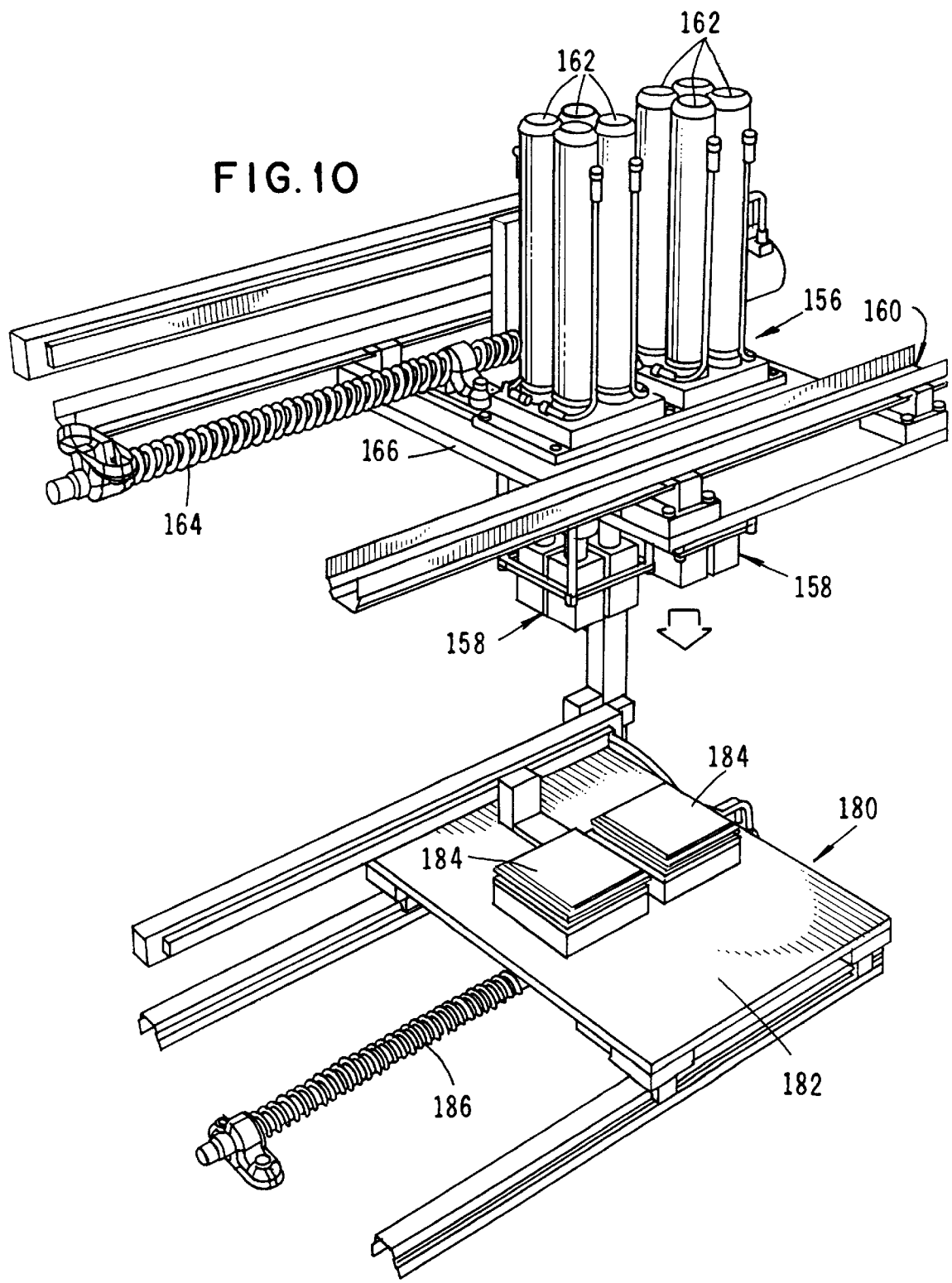

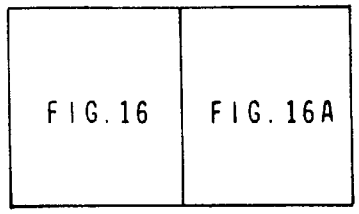
FIG. 16B
FIG. 16
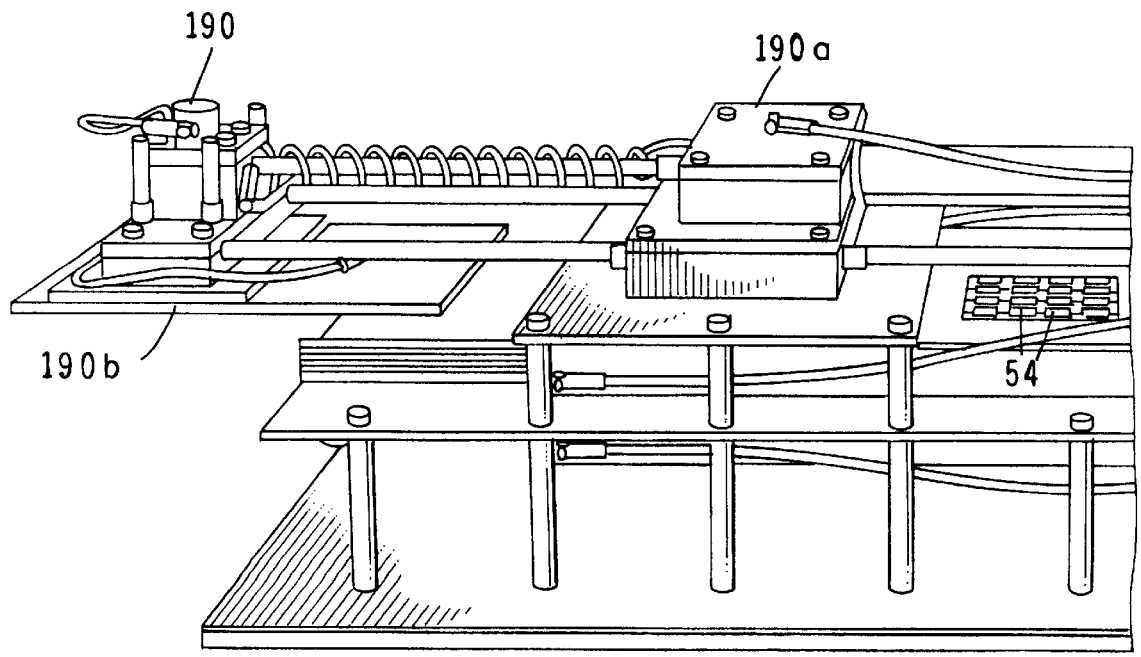

METHOD AND APPARATUS FOR MAKING FLUID DELIVERY DEVICE

BACKGROUND OF THE INVENTION

1. Field of the Invention

The present invention relates generally to methods and apparatus for making fluid delivery devices for infusing medicinal agents into an ambulatory patient at specific rates over extended periods of time. More particularly, the invention concerns a novel method and apparatus for the large volume manufacture of small, disposable fluid delivery devices for infusion of medicinal agents into a ambulatory patient.

1. Discussion of the Prior Art

Many medicinal agents require an intravenous route for administration thus bypassing the digestive system and precluding degradation by the catalytic enzymes in the digestive tract and liver. The use of more potent medications at elevated concentrations has also increased the need for accuracy in controlling the delivery of such drugs. The delivery device, while not an active pharmacologic agent, may enhance the activity of the drug by mediating its therapeutic effectiveness. Certain classes of new pharmacologic agents possess a very narrow range of therapeutic effectiveness, for instance, too small a dose results in no effect, while too great a dose results in toxic reaction.

In the past, prolonged infusion of fluids has generally been accomplished using gravity flow methods, which typically involve the use of intravenous administration sets and the familiar bottle suspended above the patient. Such methods are cumbersome, imprecise and require bed confinement of the patient. Periodic monitoring of the apparatus by the nurse or doctor is required to detect malfunctions of the infusion apparatus.

The fluid delivery devices made in accordance with the method of the present invention overcome many of the drawbacks of the prior art by making use of advanced types of prestressed elastomeric films which, in cooperation with a base, define a fluid chamber that contains the fluid which is to be dispensed. The prestressed elastomeric film membrane, which is further distended during the filling of the fluid chamber, controllably forces fluid within the chamber outwardly of the device as the membrane moves toward its less distended stating configuration.

The elastomeric film materials used in the fluid delivery devices manufactured in accordance with the methods of the present invention, as well as various alternate constructions of the fluid delivery devices themselves, are described in detail in U.S. Pat. No. 5,205,820 issued to the present inventor. Therefore, U.S. Pat. No. 5,205,820 is hereby incorporated by reference in its entirety as though fully set forth herein. Co-pending U.S. Ser. No. 08/451,520 filed by the present inventor on May 26, 1995 also describes several alternate constructions of fluid delivery devices that can be manufactured in accordance with the teachings of the present invention. This co-pending application, which also discloses an apparatus for making fluid delivery devices on an individual basis, is also hereby incorporated by reference in its entirety as though fully set forth herein.

As will be better appreciated from the discussion which follows, the methods and apparatus of the present invention are ideally suited for the large-scale manufacture of fluid delivery devices of the character described herein and in application Ser. No. 08/451,520. These delivery devices typically comprise a base assembly and a stored energy means provided in the form of a thin, prestressed, distendable, elastomeric membrane which after being cut in a manner described in Ser. No. 08/451,520, cooperates with the base assembly to form a fluid reservoir. Contained within a cavity formed in the base assembly is circuitously shaped, hollow cannula which includes an inlet in communication with the fluid reservoir and an outlet formed in a needle-like segment, which extends generally perpendicularly downward from the lower surface of the base assembly for subdermal infusion of medicinal fluids into the patient.

The novel fluid delivery devices manufactured in accordance with the present invention have an extremely low profile and are eminently capable of meeting the most stringent of fluid delivery tolerance requirements. The devices are small, easy to use and, in accordance with the method of the present invention, can be manufactured in very large quantities at low cost.

SUMMARY OF THE INVENTION

It is an object of the present invention to provide a method and apparatus for the high volume manufacture of fluid delivery devices which embody a self-contained, stored-energy source for expelling fluids from the reservoir of the device into an ambulatory patient at precisely controlled rates over extended periods of time.

It is another object of the invention to provide a method and apparatus of the aforementioned character in which the self-contained, stored-energy source comprises an elastomeric membrane and in which the fluid dispensing devices are manufactured in arrays each array comprising a cover array which is superimposed over and connected to a base array with the elastomeric membrane being captured therebetween.

Another object of the invention is to provide an apparatus for the continuous assembly of fluid delivery devices of the character described in the preceding paragraphs in which the elastomeric membrane material which forms the stored-energy source is continuously unrolled from a large roll of film-backed material which is rotatably mounted on a turret assembly upon which a second back-up roll of elastomeric membrane material is also mounted.

Another object of the invention is to provide an apparatus of the character described in the immediately preceding paragraph which further includes membrane splicing means for splicing together the end of the primary roll and the beginning of back-up roll of the rolls mounted on the turret assembly.

Another object of the invention is to provide an apparatus as described which includes a novel tenter apparatus for controllably, biaxially stretching the membrane material following its removal from the rolls of membrane material carried by the turret assembly.

Another important object of the invention is to provide a method and apparatus of the character described in which, without interrupting the forward travel of the biaxially stretched, elastomeric membrane, the membrane is automatically sealably captured between the cover and base arrays.

Another object of the invention is to provide a method and apparatus of the class described in which, following assembly of the various components of the infusion devices, the finished devices are automatically labeled and packaged for shipment.

DESCRIPTION OF THE DRAWINGS

FIG. 3A is a generally perspective view showing the appearance of the array of fluid delivery devices constructed by sealably bonding together the base, the cover and elastomeric membrane components shown in FIG. 3.

FIG. 4 is a generally perspective view of one of the individual fluid delivery devices of the array shown in FIG. 3A after being separated from the connecting sprues.

FIG. 4A is a side-elevational, cross-sectional view of the individual fluid delivery device shown in FIG. 4 and produced in accordance with the method of the invention.

FIG. 4B is a generally perspective, exploded view of the device shown in FIG. 4.

FIGS. 5A, 5B, and 5C when considered together, in the manner illustrated in FIG. 5D comprise a side-elevational view of one form of the apparatus of the present invention for the continuous assembly of the various components of the fluid delivery device shown in FIG. 4. More particularly, FIG. 5A shows the operator control portion of the apparatus along with the support means for rotatably supporting primary and back-up rolls of elastomeric membrane from which the energy source of the fluid dispensing device of FIG. 4A is formed and the lower array input feeder. FIG. 5B illustrates the splicer subassembly, the tension dancer arm, the membrane accumulator subassembly; membrane stretching means of the apparatus of the invention for controllably stretching the elastomeric membrane to form a prestressed membrane having internal stresses formed therewithin. Also shown in FIG. 5B is a portion of the upper and lower in feed array assemblies, a portion of the array take-off assembly, the sealing means and a portion of the over and under walking beam assembly of the invention for sealably interconnecting the cover components of the cover array shown in FIG. 1 with the base components of the base array shown in FIG. 2. FIG. 5C is a side-elevational view showing portions of the positioning means for positioning the cover array with respect to the sealing means of the invention. Also illustrated in FIG. 5C is one form of the upper array input assembly, the array take-off assembly and the packaging, labeling and sealing portion of the apparatus for final packaging of the fluid dispensing devices produced in accordance with the method of the invention.

FIGS. 7A, 7B, and 7C when considered together, comprise a generally perspective view of the apparatus of the invention shown in FIGS. 5A, 5B, and 5C.

FIG. 7D is a generally perspective, fragmentary view similar to FIG. 7A, but showing in greater detail the support means of the invention for supporting the rolls of elastomeric membrane material. Also shown in greater detail is the splicing means of the invention for splicing together lengths of elastomeric membrane and also showing in greater detail the dancer arm assembly of the invention which monitors and maintains proper speed and tension on the elastomeric membrane as it advances forwardly of the apparatus. Further shown is the membrane accumulator assembly of the invention.

FIG. 9 and FIG. 9A when considered together in the manner illustrated in FIG. 9B comprise a fragmentary, generally perspective view of the upper array input assembly of the apparatus.

FIG. 10 is a fragmentary, generally perspective view of the reciprocating assembly shuttle which cooperates with the sonic bonding means of the apparatus to bond together the cover and base components.

FIG. 16 and 16A when considered together in the manner illustrated in FIG. 16B comprise a generally diagrammatic, perspective view illustrating the position of the subassemblies of the apparatus at the commencement of the final packaging step.

DESCRIPTION OF THE INVENTION

Figure 1:
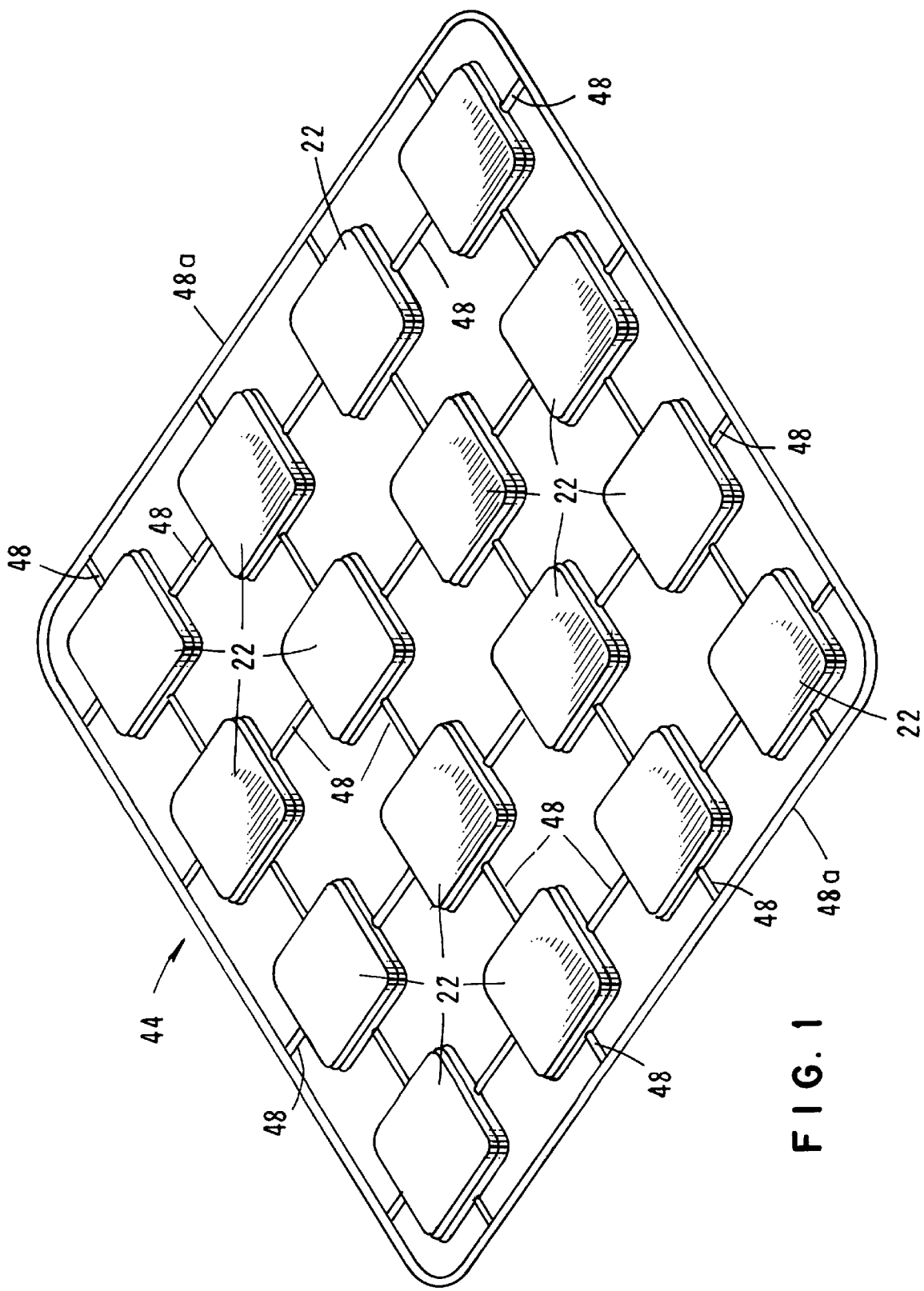
FIG. 1 is a generally perspective view of a cover array comprising a plurality of individual covers of the fluid delivery devices which are to be produced in accordance with the method of the present invention.

Referring to the drawings and particularly to FIGS. 4 and 4A, one embodiment of the infusion device produced in accordance with the method of the invention is there shown and generally designated by the numeral 14. As best seen in FIG. 4A, the infusion device, which functions to controllably infuse medicinal agents into an ambulatory patient, comprises a base component or assemblage 16 which includes a base member 16a. Base member 16a has an upper surface 18, which includes a central portion 18a, and a peripheral portion 18b. Formed within base member 16 is a cavity or chamber 20, the purpose of which will presently be described.

Sealably interconnected with base component 16 is a cover component 22 having a generally toroidal shaped cavity 24 formed therein. Sealably captured between base component 16 and cover component 22 is a prestressed elastomeric membrane 27. Membrane 27, which comprises the stored energy source of the device, is distendable by fluids under pressure introduced into the device from a generally planar configuration into a distended configuration of the character shown in FIG. 4A. When so distended, membrane 27, in cooperation with the upper surface 18 of the base component, forms a generally toroidal-shaped fluid chamber 30.

Also forming a part of base assembly 16 is cannula means for controllably delivering fluid from reservoir 30 to an ambulatory patient. The cannula means here comprises a generally spiral-shaped, hollow cannula 32 having an inlet 34 in communication with reservoir 30 and an outlet defined by a needle-like piercing extremity 36. Disposed intermediate inlet 34 and outlet 36 is a spiral body portion 38 which is supported within chamber 20 of the base component.

With the cannula means appropriately mounted within chamber 20, a needle cap assembly 40 is connected to base 16a. Needle cap assembly 40 here comprises a base portion 40a which is affixed to base 16a and a sheath portion 40b which functions to encapsulate the piercing extremity 36 of the cannula. Formed between base portion 40a and sheath portion 40b is serration 40c which permits the sheath portion to be broken away from the body portion at time of use to expose extremity 36.

During use of the device and after the reservoir of the apparatus has been filled with the appropriate beneficial agent to be infused which causes membrane 27 to distend to the position shown in FIG. 4A, the sheath of the needle cap assembly 40 can be separated from the assemblage by breaking it along the serration 40c. This done, the device can be easily interconnected with the patient by penetrating the patient's skin with the piercing extremity 36 of the cannula means. As the patient's skin and tissue is penetrated by the infusion needle, an adhesive pad 39 provided on the lower surface of the base 16a will cause the base component to adhere to the patient's skin. In some instances, it is desirable to provide a protective peel layer over the adhesive pad until the time the device is to be used. In such instances, the protective layer is peeled from the lower surface of base 16a immediately prior to use of the device.

With the infusion device securely interconnected with the patient, and with the sheath 40b removed from the base component, distendable membrane 27 will tend to return to its less distended configuration due to the internal stresses formed in the membrane during the reservoir filling step. As the distendable membrane moves toward base 16a, the fluid contained within reservoir 30 will flow into the patient at a precisely controlled rate. In this regard, it is to be noted that elastomeric membrane materials suitable for use as the stored energy means must possess certain physical characteristics in order to meet the performance requirements for a fluid delivery apparatus. More particularly, for good performance, the elastomeric membrane material must have good memory characteristics under conditions of high expansion; good resistance to chemical and radiological degradation; and appropriate gas permeation characteristics depending upon the end application to be made of the device. Reference should be made to application Ser. No. 08/451,520 which is incorporated herein by reference for more details concerning the construction and operation of the infusion device 14 including details concerning the nature of the stored energy source, the cannula means, and the protective needle cap assembly and for details concerning the materials suitable for use in constructing the base and cover components.

Figure 2:
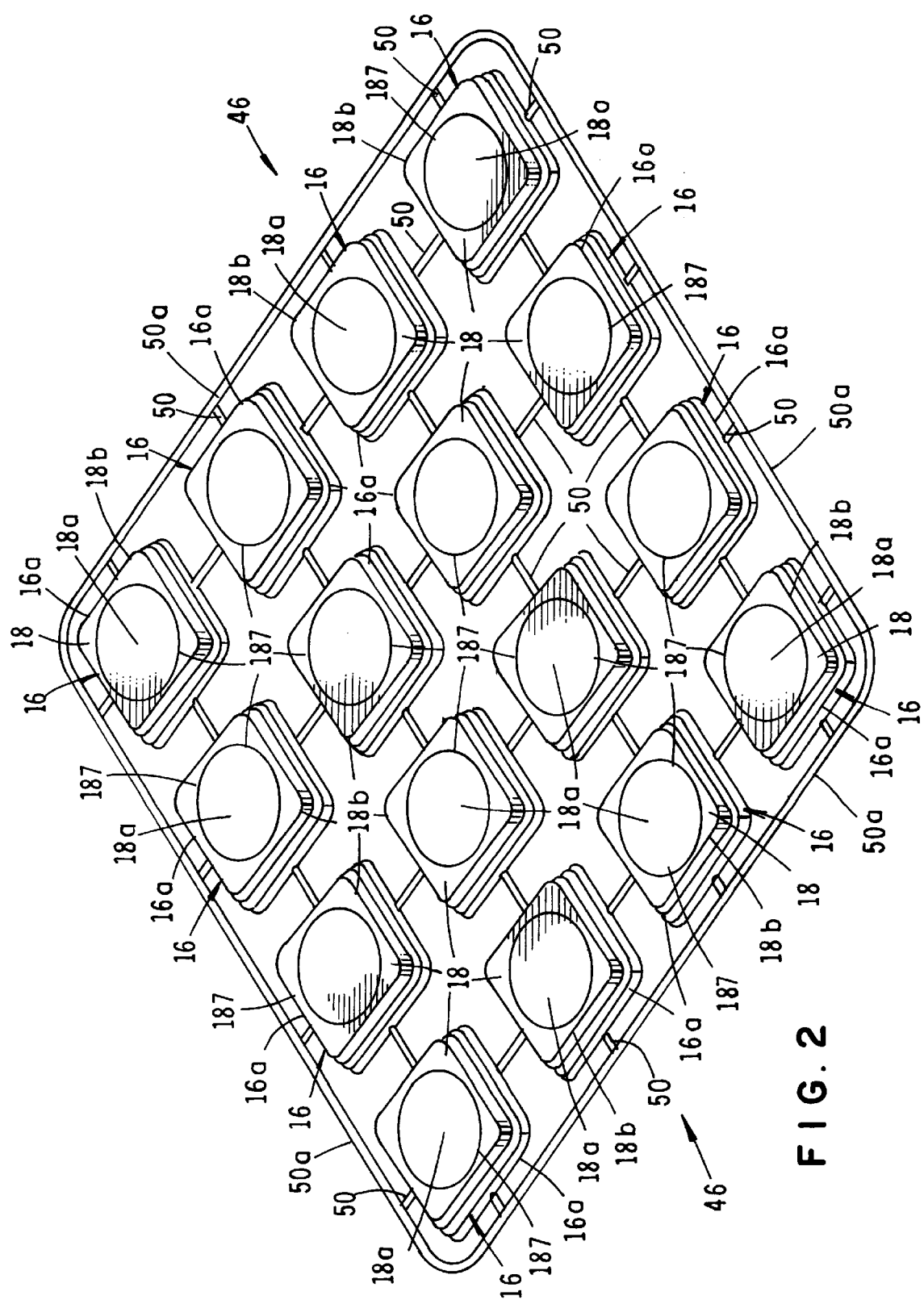
FIG. 2 is a generally perspective view of a base array comprising a plurality of base assemblies of the fluid delivery devices which are to be produced in accordance with the method of the invention.
Figure 3:
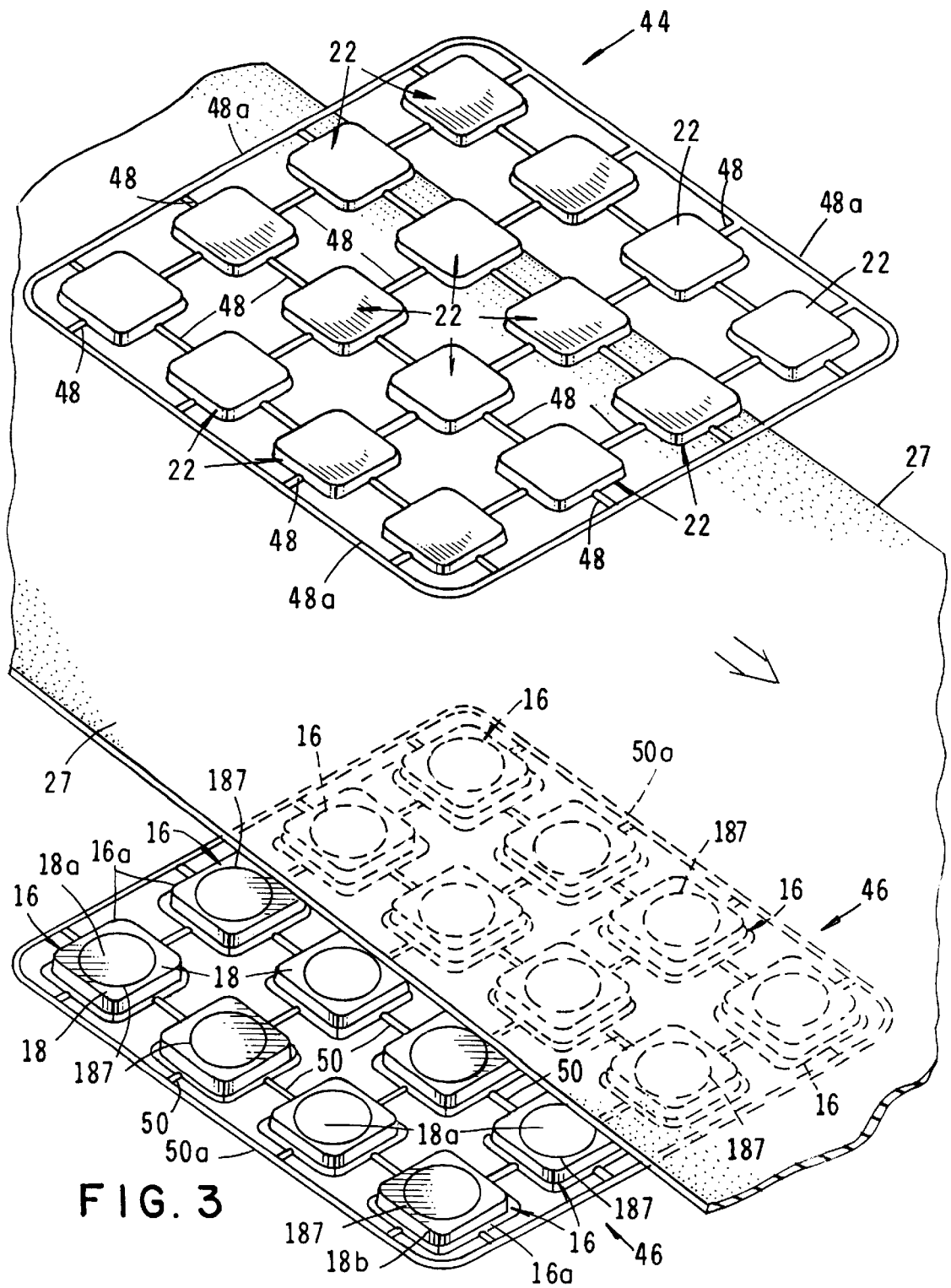
FIG. 3 is a generally perspective view similar to FIGS. 1 and 2, but showing a length of biaxially stretched, elastomeric membrane disposed intermediate the cover and base arrays.

Turning next to FIGS. 1, 2, and 3, in accordance with one form of the method of the invention, the infusion devices 14 are produced in large volume by a continuous process whereby injection molded base arrays and cover arrays of the character shown in FIGS. 1 and 2 of the drawings are sealably interconnected together using the apparatus of the invention. One form of the cover array of the invention is shown in FIG. 1 and designated by the numeral 44 while one form of the base array of the invention is shown in FIG. 2 and is designated by the numeral 46.

Cover array 44 comprises a plurality of adjacent cover components 22 each of which is interconnected with an adjacent cover component 22 by at least one sprue element 48. Similarly, base array 46 comprises a plurality of adjacent base components 16 each of which is interconnected with an adjacent base component by one or more sprue elements 50. As indicated in FIG. 1, the outer sprue elements 48 are interconnected with a circumferentially extending sprue-like member 48a while the outer most sprue elements 50 of the base array are interconnected with a circumferentially extending sprue-like element 50a (FIG. 2).

As will be discussed in greater detail hereinafter, during the assembly of the cover and base arrays in accordance with one form of the method of the invention, the cover array is superimposed over the base array with the elastomeric membrane 27 disposed therebetween in the manner shown in FIG. 3. In accordance with the method of the invention, the cover components 22 and the base components 16 are then interconnected and sealably bonded together to form the product array shown in FIG. 3A and generally designated by the numeral 54. Product array 54 comprises a plurality of interconnected together, fully assembled fluid delivery devices of the character previously described, each having a cover component 22, a base component 16 having a downwardly extending cannula assembly, including a protective sheath 40, and a portion of the prestressed elastomeric membrane 27 captured therebetween. In accordance with the method of the invention, following the assembly operation, the assembled fluid delivery devices 14 are separated from the sprue members 50 to form a plurality of individual final product, fluid dispensing devices of the general character illustrated in FIG. 4. The specific details of the novel method of the invention whereby the cover components and the base components are sealably interconnected to form the array shown in FIG. 3A will be discussed further in the paragraphs which follow.

Turning next to FIGS. 5A, B, and C; 6A, B, and C; and 7A, B, and C, one form of the apparatus of the present invention for continuous assembly of the various components of the fluid delivery device 14 is there shown. Turning particularly to FIGS. 5A and B, 6A and B, and 7A and 8, the operator control means and part of the support means of one form of the apparatus of the invention is there shown. The control means for controlling and monitoring the various component assembly mechanisms of the apparatus is generally designated as 60 in FIGS. 5A, 6A and 7A, and 7B and C. Means 60 here comprises a systems control monitor 62, an operations monitor 64, an operator keyboard input station 66, and an operator data tablet input station 68. For convenience, these operably interconnected monitoring and input devices are mounted in a mobile framework 70 of the character shown in FIGS. 5A, 6A, and 7A. Control means 60 is constructed from conventional, commercially available devices of a character well known to those skilled in the art, and the interconnection and operation of these devices is well understood.

Figure 6A:
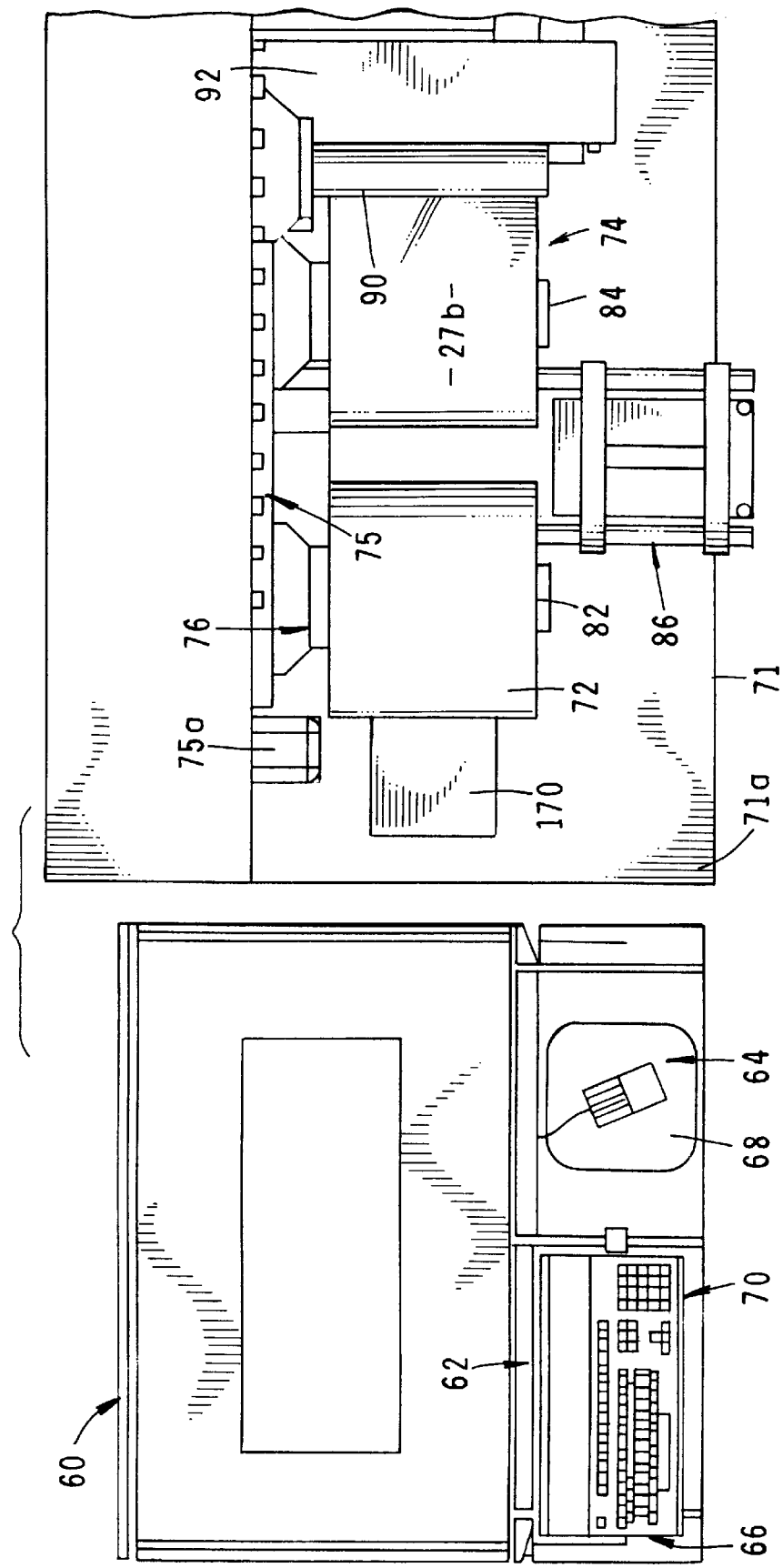
FIGS. 6A, 6B, and 6C when considered together, comprise a top plan view of the apparatus of the invention shown in FIGS. 5A, 5B, and 5C.

Shown in the right-hand portions of FIGS. 5A, and 6A and in all of FIGS. 5B and C; 6B and C; and 7B and C are the various cooperating subassemblies which make up the component assembly means of the invention for assembling together the several components which make up the fluid delivery device 14. These subassemblies are mounted within an elongated framework 71 having a first end 71a and a second end 71b.

Figure 6B:
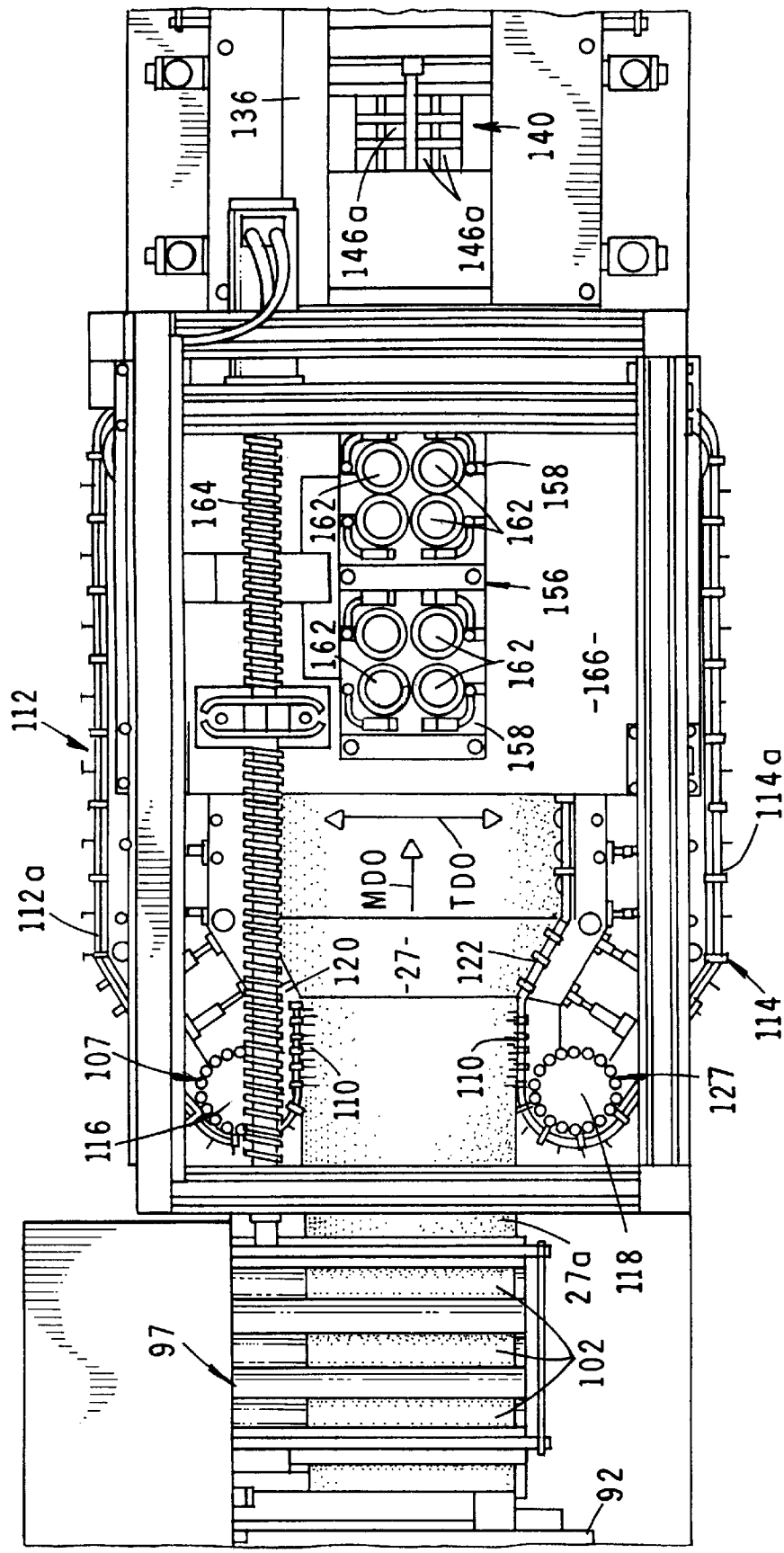
Figure 6C:
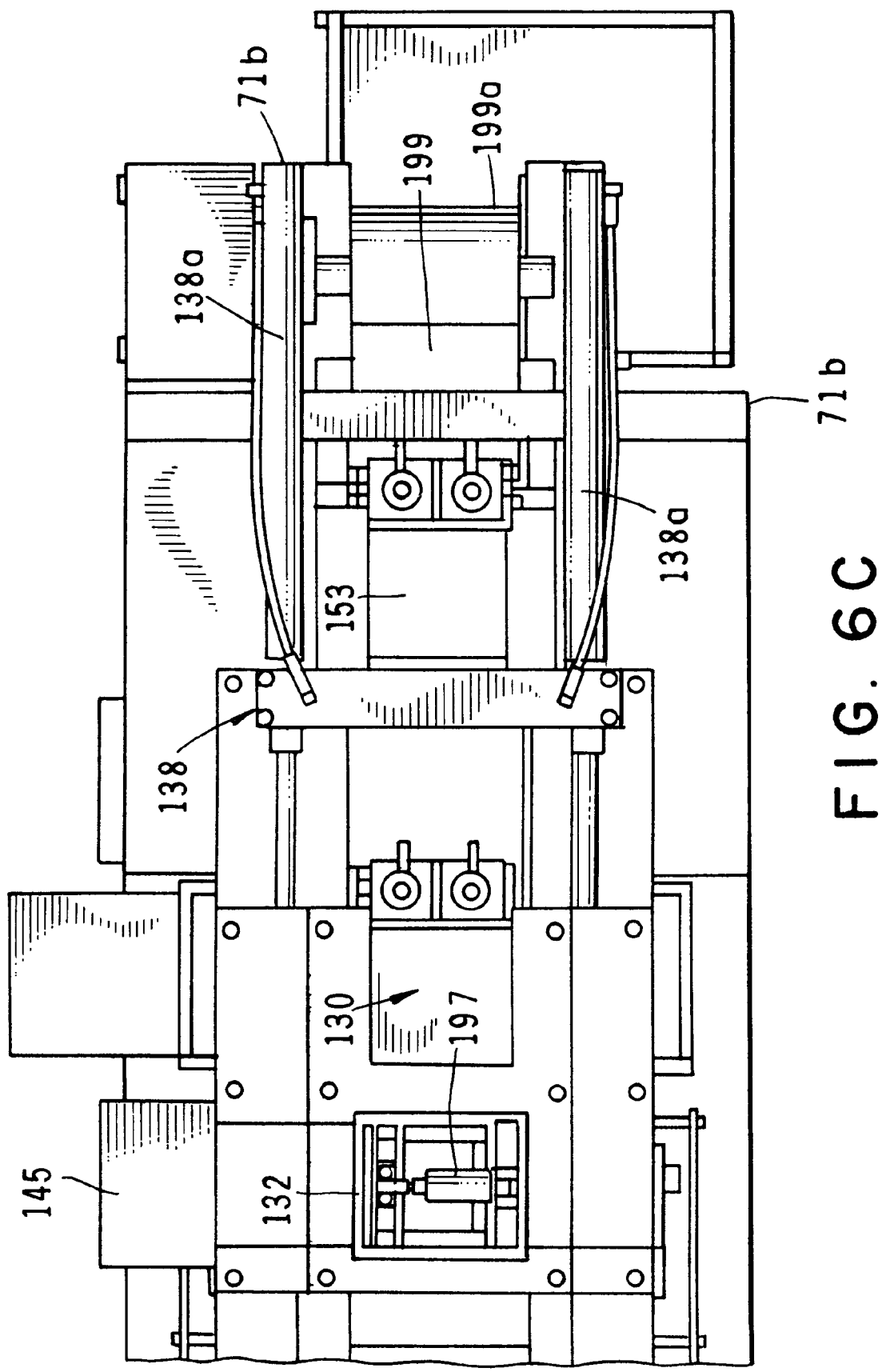
Figure 7A:
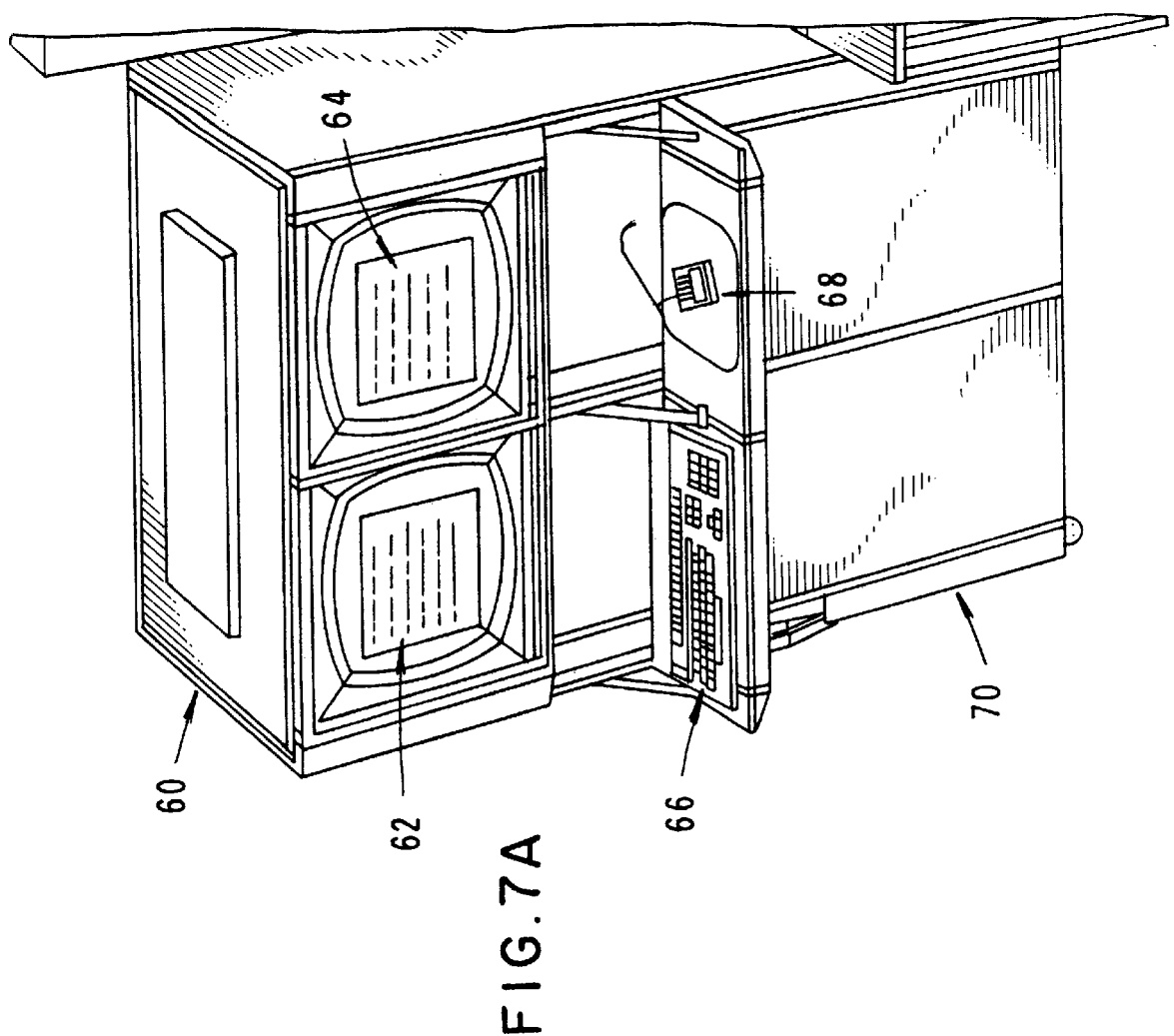

The first subassembly of the component assembly means of the invention consists of a novel support means of the character shown in the right-hand portions of FIGS. 5A, 6A, and 7A and the left-hand portions of FIGS. 5B, 6B, and 7B. The important support means of the invention functions to rotatably support primary and back-up rolls 72 and 74 of film-backed lengths of elastomeric material. As best seen in FIGS. 5A, 7B and 7D, rolls 72 and 74 are mounted on a novel turret assembly 76 which is supported proximate the first end 71a of the supporting framework 71 and includes a turret plate 78 that can be controllably rotated about a central rotational axis 80. Mounted on plate 78 is a pair of spaced apart spindles 82 and 84. Spindle 82 rotatably supports back-up roll 72 while spindle 84 rotatably supports primary roll 74. A loading means, best seen in FIGS. 5A, 5B, 7B and 7D, is provided in the form of a roll loading subassembly 86, including a lift mechanism 86a, which can be used to conveniently load the film-backed rolls of elastomeric material onto spindles 82 and 84.

In carrying out the method of the invention, the driving motors of the various operating mechanisms of the apparatus are energized using a control panel 75 of conventional construction. When the mechanisms are operating, a warning light 75a is illuminated. As an initial step, the elastomeric membrane is removed from roll 74 by the membrane removal means of the invention in the manner shown in FIG. 5B so that the unstretched elastomeric membrane 27a is separated from the backer sheet 27b. More particularly, as the membrane 27a is unrolled from roll 74, the backing film 27b is rolled about a film take-up roll assembly 90 which is positioned proximate turret assembly 76. After being unrolled from roll 74, the membrane passes through a novel splicing means generally designated in FIG. 5B by the numeral 92. This splicing means is of generally conventional construction and functions to splice together the ends of the elastomeric membranes which make up the primary and back-up rolls. For example, when roll 74 is exhausted, the end thereof will be stopped at a predetermined position within the splicing means 92. The turret assembly 76 will then be rotated so that roll 72 is moved into the feed position previously occupied by roll 74. With roll 72 in the feed position, a length of elastomeric membrane is removed from the roll, passed under film roller 95a, placed upon splicing table 92a, and then inserted into the splicing means 92 where it will be spliced together with the inboard end of roll 74. Following the splicing operation, forward travel of the unstretched membrane can then continue with the membrane moving forwardly of the apparatus and with the backing 27b of roll 72 being continuously taken up by take-up roll assembly 90.

After the unstretched elastomeric membrane 27a passes through the splicing means, it is entrained over a guide roller 95b and under a dancer arm roller 96a which roller forms a part of the dancer arm assembly 96 of the invention. The dancer arm assembly comprises, in addition to roller 96a, a dancer arm assembly 98 which pivots about a pivot arm 100 (FIGS. 5B and 7D). The dancer arm assembly feeds on accumulator assembly 97 which comprises a plurality of longitudinally, spaced-apart rollers 102 which, along with dancer arm assembly 98 (FIGS. 5B and 7D), function to monitor and maintain the proper speed and tension on the membrane 27a as it advances forwardly of the apparatus toward the second end thereof 71b. Dancer arm assembly 96 and accumulator assembly 97 are generally of a character known to those skilled in the art and their operation is well understood by those engaged in continuous film processing operations.

As the unstretched membrane 27a continues its forward travel of the apparatus due to the urging of the membrane removal means, it will enter the important biaxial stretching means of the invention which comprises a part of the membrane removal means and which functions to controllably prestress the membrane to form the prestressed membrane 27 used in the production of the infusion devices 14. The biaxial stretching means, which removes the membrane from the rolls of the support means and controllably stretches it, can take several forms, but preferably comprises a tenter apparatus 107 of the general character best seen in FIG. 5B, 6B, 7B, and 7D of the drawings.

While a number of different types of tenter apparatus have been suggested in the past and their design and operation is well known, a tenter apparatus of the general character described in German patent 1,504,479 issued to Erwin Kampf can be used in modified form to accomplish the biaxial stretching step of one form of the method of the invention.

Figure 7E:
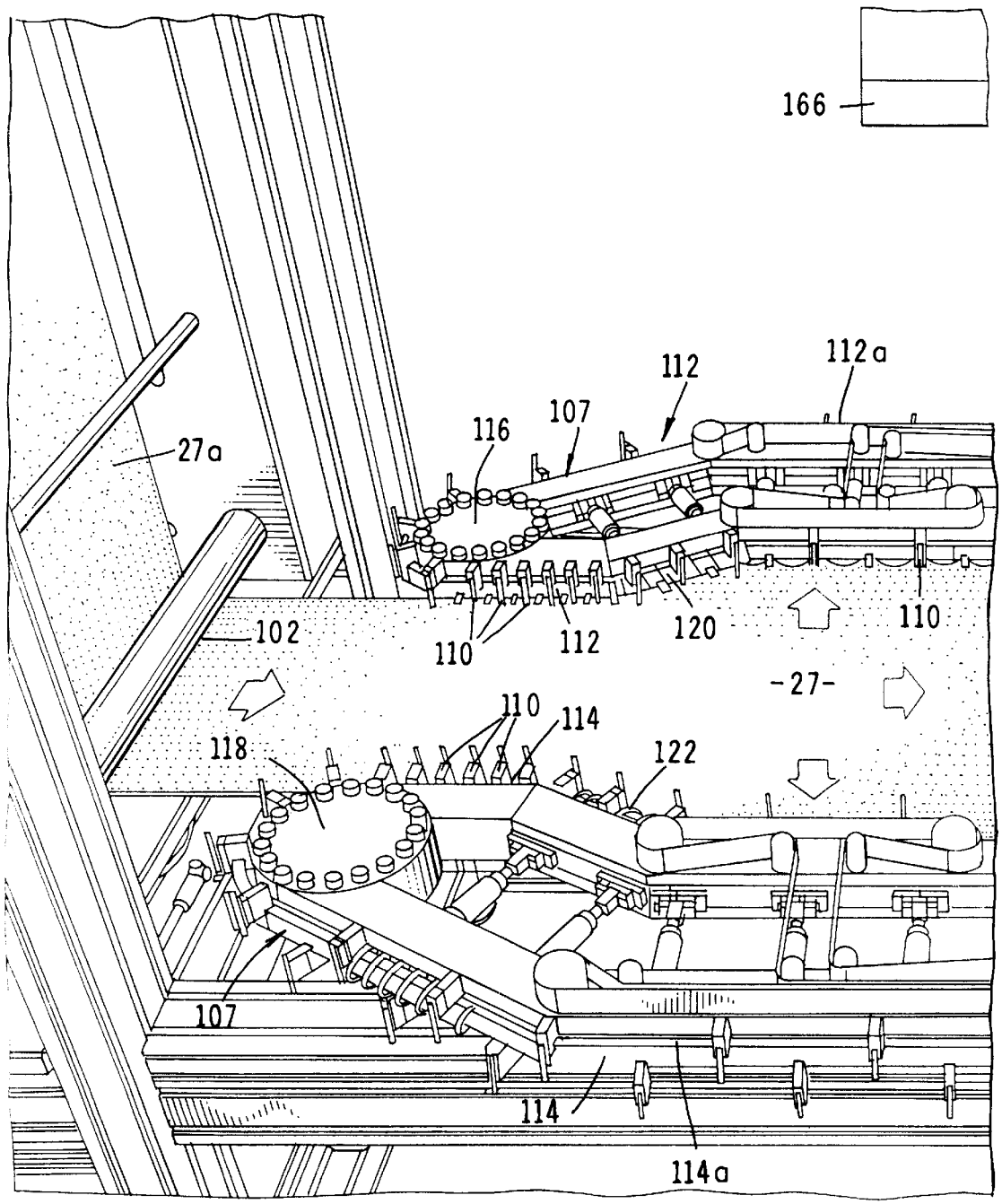
FIG. 7E and 7F when considered together comprise a fragmentary, generally perspective view showing in greater detail the membrane stretching means or tenter apparatus of the invention also shown in FIG. 7B.
Figure 7F:
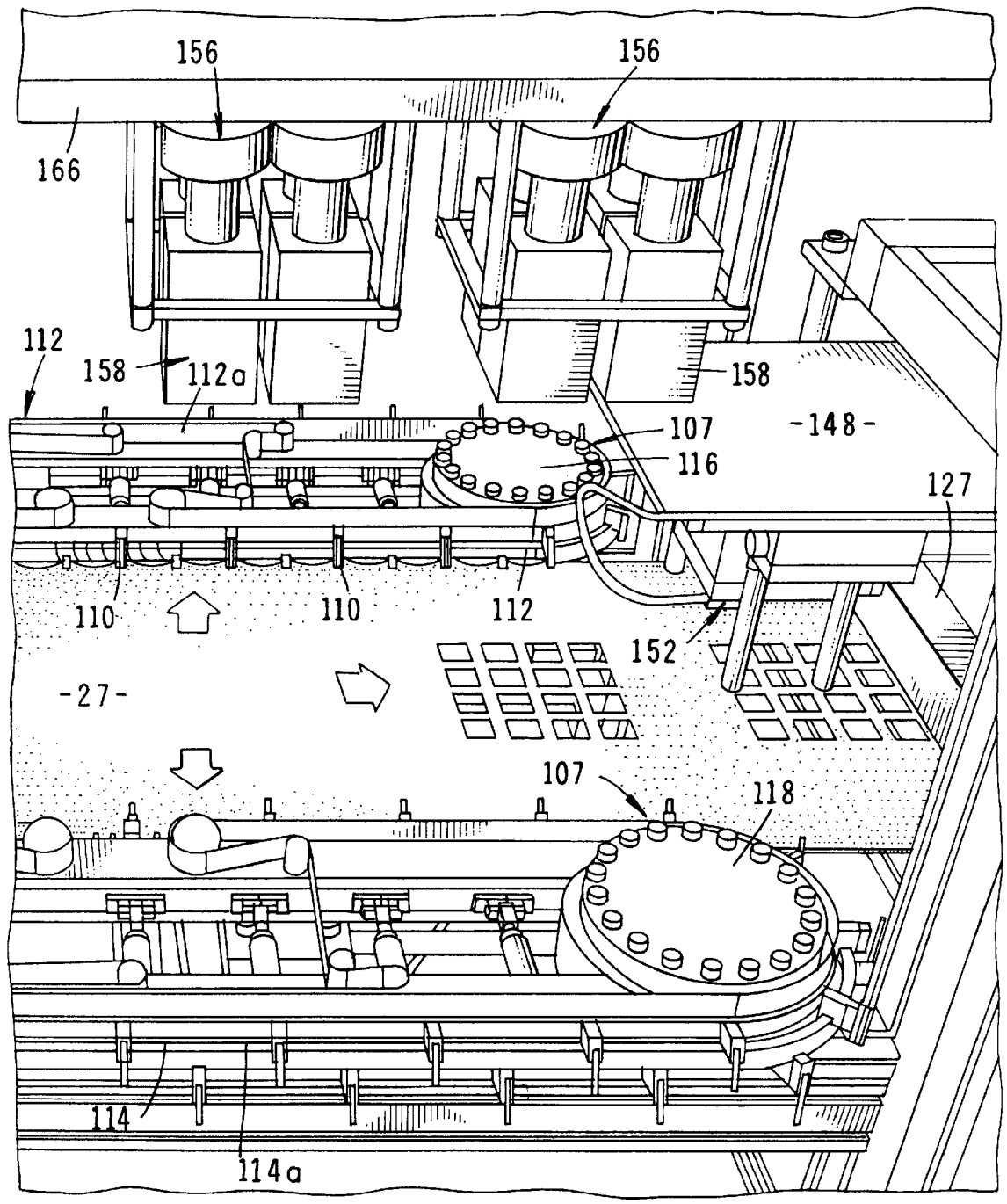

As best seen in FIG. 7E, as the unstretched membrane 27a is unrolled from roll 74, it is introduced into the tenter apparatus 107 in a manner such that the edges of the membrane are securely gripped by upper and lower anvils of gripping clamps 110. These gripping clamps are, in turn, operably associated with transversely spaced-apart elongated endless chain assemblies 112 and 114 which travel along guide rails 112a and 114a respectively (see also FIG. 6B). As the chains move about rotating sprockets 116 and 118 and toward differential screws 120 and 122, the gripping clamps urge the membrane forwardly of the apparatus and diverge outwardly so as to controllably impart biaxial stretching forces to the membrane 27a causing it to be controllably stretched both transversely and longitudinally, that is in both an axial direction and a transverse direction to establish the require strain energy density for the membrane. More particularly, the biaxial stretching is accomplished simultaneously in the machine direction orientation (MDO) and in the transverse direction orientation (TDO) (FIG. 6B). It is to be understood that the stretching ratios can be precisely tailored to each axis to provide the desired initial strain energy density and extension pattern of the distendable membrane. Under certain circumstances, the extension values for the MDO axis may be different than the extension values for the TDO axis. It is to be appreciated, however, that in certain instances, no prestretch of the membrane will be desired and the tenter frame apparatus will not be used. As the distendable membrane 27a is stretched to produce a prestressed membrane 27 of the desired biaxial dimension, it travels forwardly of the apparatus due to the urging of the membrane removal means at a uniform controlled first rate of speed.

The next step in the method of the invention, is the important infusion device assembly step wherein the prestressed membrane is sealably captured between the individual base components 16 of the base arrays and the individual cover components 22 of the cover arrays. This unique assembly step is accomplished without process interruption as the prestressed membrane travels forwardly of the apparatus in a direction toward an end take-up roller assembly 127 (FIG. 12) mounted proximate the second end 71b of the supporting framework 71. Roller assembly 127, which receives and rolls up the waste membrane that remains after the devices 14 have been assembled, comprises a part of the membrane removal means of the invention (FIGS. 5C and 7C). In a manner next to be described, the assembly of the prestressed membrane with the base and cover components of the infusion device, is uniquely accomplished continuously and "on the fly" without any interruption of the uniform forward travel of the prestressed membrane.

The first step in the device assembly step is accomplished using the first positioning means of the invention which functions to sequentially position cover arrays of the character shown in FIG. 1 in close proximity with the novel sealing and bonding means of the apparatus, the nature of which will presently be described. As will also be further described in the paragraphs which follow, at the same time that the cover components of the cover arrays are being positioned proximate the sealing means, the base arrays of the character shown in FIG. 2 are being sequentially positioned by a second positioning means at a location below the moving membrane and in alignment with the cover arrays.

The first positioning means of the apparatus of the invention, which is best shown in FIGS. 5C, 6C, 7C and 9, comprises a cover array input hopper assembly 130 and a cover array sprue punch assembly 132, both of which are mounted on a frame 134 that is superimposed over an open framework 136 which includes an array supporting table 137 that is reciprocally movable longitudinally of the framework by a pneumatic assembly generally designated in the drawings by the numeral 138 which includes operating airlines 138a which are connected to a suitable source of air under pressure (see particularly FIG. 9). Pneumatic assembly 138 is of a character well known to those skilled in the art, and the components thereof are readily commercially available from sources such as compact Air Products of Westminster, S.C.; Robohand, Inc. of Monroe, Conn.; and Watts Fluid Air, of Kittery, Me. Table 137, which is slidably disposed internally of frame 136, includes a pair of grid-like sections 140, each of which is provided with a plurality of rectangular shaped openings 140a which are sized and arranged to closely receive the individual cover components 22 of cover arrays 44 of the character shown in FIG. 1. Strategically positioned below frame 136 is a backing plate 142 which is vertically movable from the position shown in FIG. 9 to an upraised position wherein the plate is positioned immediately below frame 136 in a manner to provide a floor to each of the openings 140a formed in grid sections 140.

Figure 8:
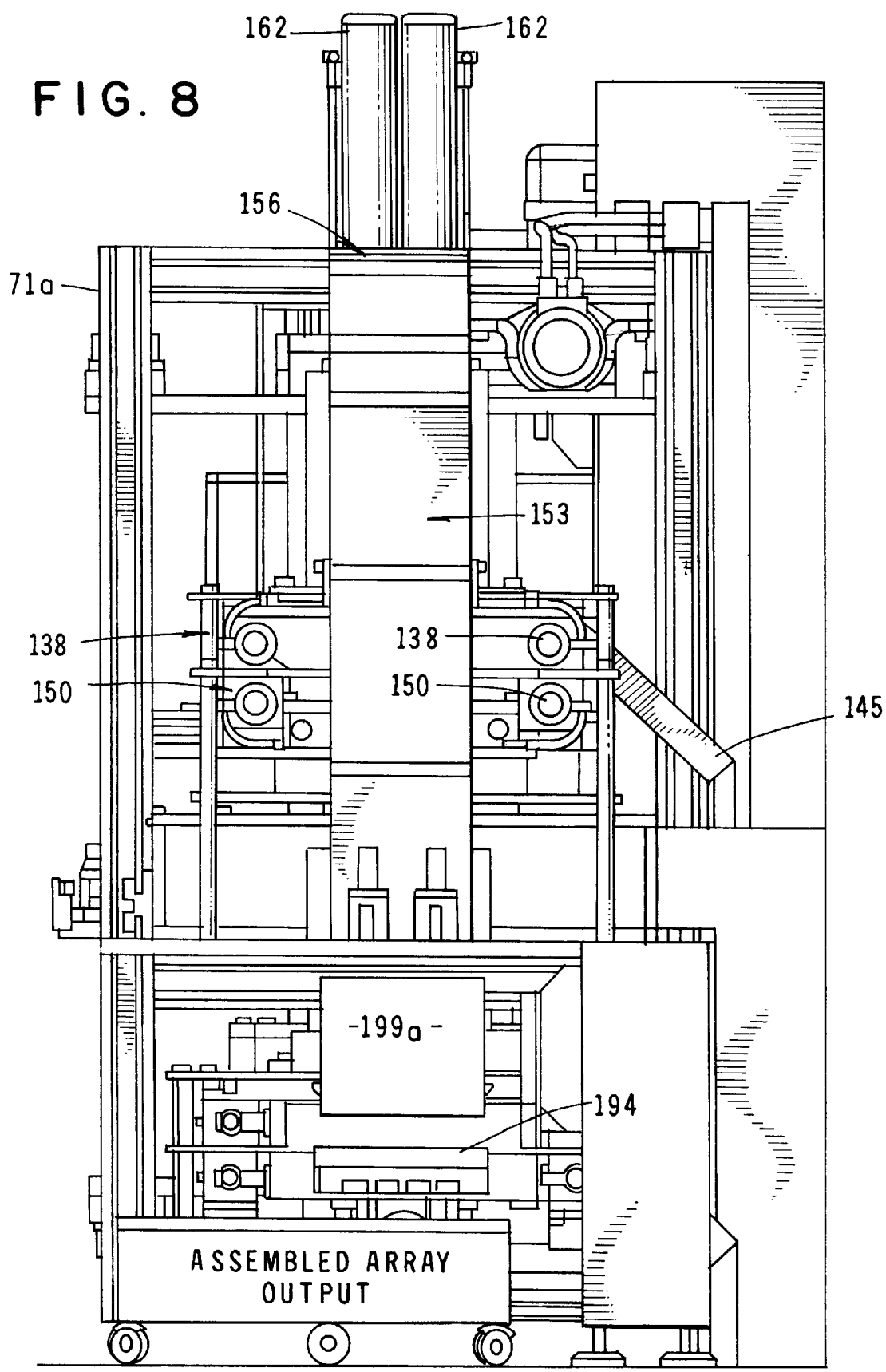
FIG. 8 is an end view of the right end of the apparatus of the invention as viewed in FIG. 6C.

After the cover arrays 44 have been sequentially removed from input hopper assembly 130 and have been positioned directly over grid-like sections 140, table 137 is moved to the left as viewed in FIG. 9 by suitable pneumatic means 138a (FIG. 5C) to a position where one of the cover arrays is disposed immediately below the cover array sprue punch assembly 132. Activation of the punch assembly will cause the punching head 132a thereof to move into engagement with and cleanly cut away the sprues 48 of the cover array. After the sprues are cut away from the first cover portion, the second cover portion is moved to a location below the sprue punch assembly and the sprues are similarly cut away from this array. The sprues which are removed from the cover arrays will reside on upper cover sprue removal 144 for removal from the apparatus by vacuum removal means of a conventional nature which includes a disposal chute 145 (FIG. 8). The vacuum removal means also comprises cylinders 144a which urge sprue removal 144 toward chute 145.

Also forming a part of the first positioning means of the invention is a cover array shuttle means, generally designated in FIG. 9 by the numeral 146. This shuttle means includes a shuttle plate 148 which is reciprocally movable longitudinally of the apparatus by a conventional type of pneumatic assembly identified by the numeral 150 (FIG. 9). Plate 148 is also movable by a second pneumatic lifting assembly 152 from a first lowered position shown in FIG. 9 to a second upper position wherein the plate resides in a coplanar relationship with plate 142. After the sprue portions 48 have been removed from a given cover array and with the cover components resting on plate 142 and entrapped within openings 140a of one of the grid sections 140, shuttle plate 148 is moved into close proximity with plate 142 and in a co-planar relationship therewith. With the plates in this position, a movement of table 137 to the left as viewed in FIG. 9, will cause the cover components which are entrapped within openings 140a to slide onto shuttle plate 148. With the cover components thusly positioned on shuttle plate 148, activation of the pneumatic assembly 150 will next move the cover components into close proximity with the sealing means of the invention, the construction of which can best be seen by referring in FIG. 10. A 16-unit tray, input 153 is shown in FIGS. 5C and 7C of the drawings to input packaging trays for containerizing this completed device.

Referring to FIGS. 5B, 6B, 7B and 10, the sealing means of the present form of the invention can be seen to comprise a sonic bonding means 156 which includes a pair of sonic bonding head and horn assemblies 158 of a conventional construction. Assemblies 158, which are commercially available from sources such as Forward Technology Industries of Minneapolis, Minn. and Dukane Corp. of St. Charles, Ill. are vertically movable relative to a supporting frame 160 by a plurality of simultaneous pneumatically operated, cylindrically shaped assemblies 162, which, like assemblies 158, are also of a character well known to those skilled in the art. It is important to note that the sonic bonding means 156 is superimposed directly over the forwardly traveling prestressed membrane 27 and, by means of a motorized servo electric mechanical ball screw assembly 164 can be moved synchronously therewith at a first rate of speed. More specifically, servo electric mechanical ball screw assembly 164 is connected to and reciprocally moves a base frame 166 of a character shown in the drawings which functions to support the sonic bonding head assemblies 158 as well as the pneumatic cylinders 162.

As will be discussed in greater detail hereinafter, after the cover components 22 of the cover arrays 44 have been positioned on shuttle plate 148, concomitant movement of shuttle plate 148 and sonic bonding head assemblies 158 will permit the cover components to be positioned directly below a vacuum capture means associated with the sonic bonding head assemblies 158. When the cover components are captured by the capture means, the covers will, of course, move with the sonic bonding means as it first accelerates and then travels synchronously with membrane 27 toward the second end of the apparatus.

Figure 11:
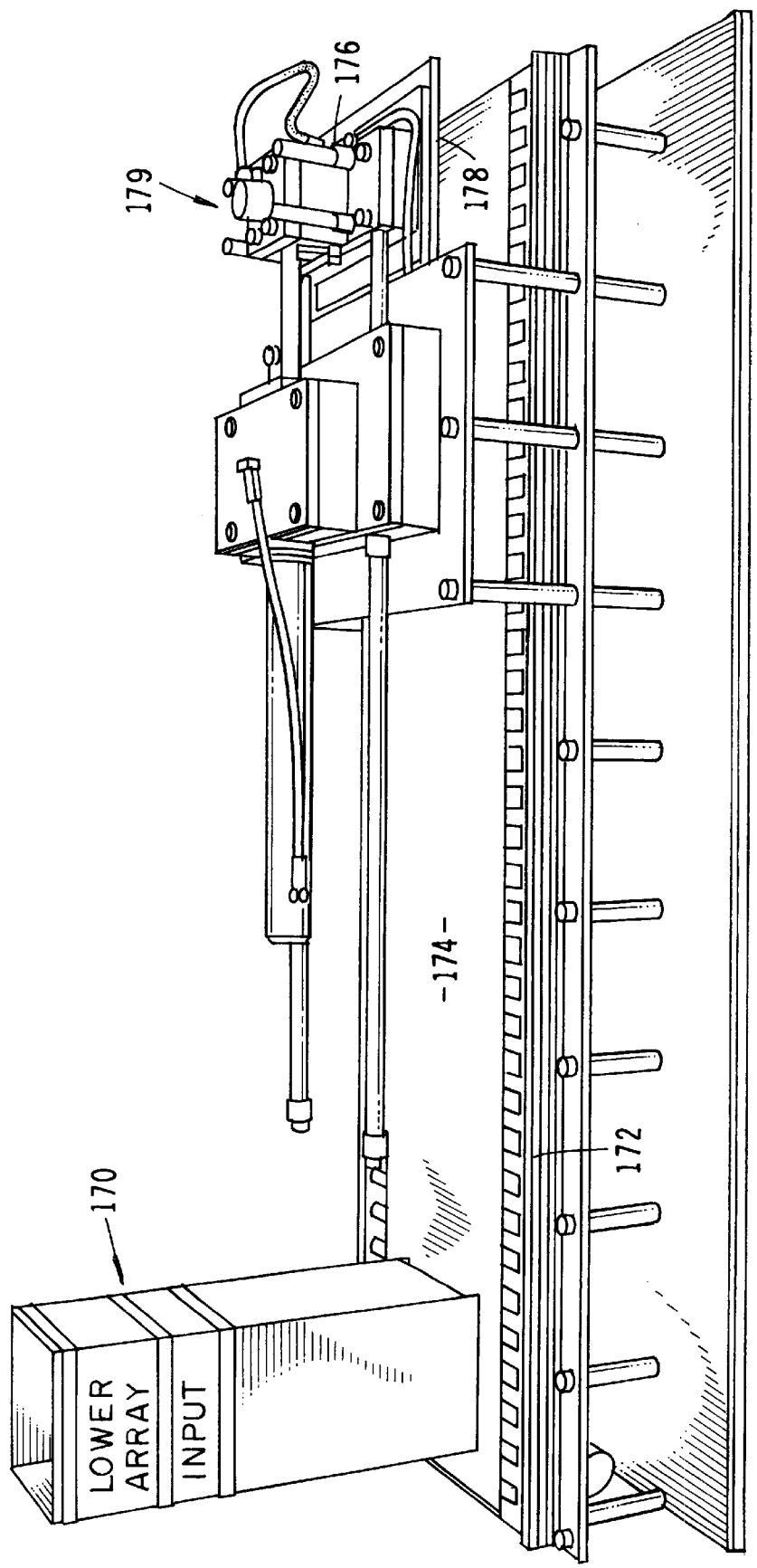
FIG. 11 is a fragmentary, generally perspective view of the lower array input assembly.
Figure 12:
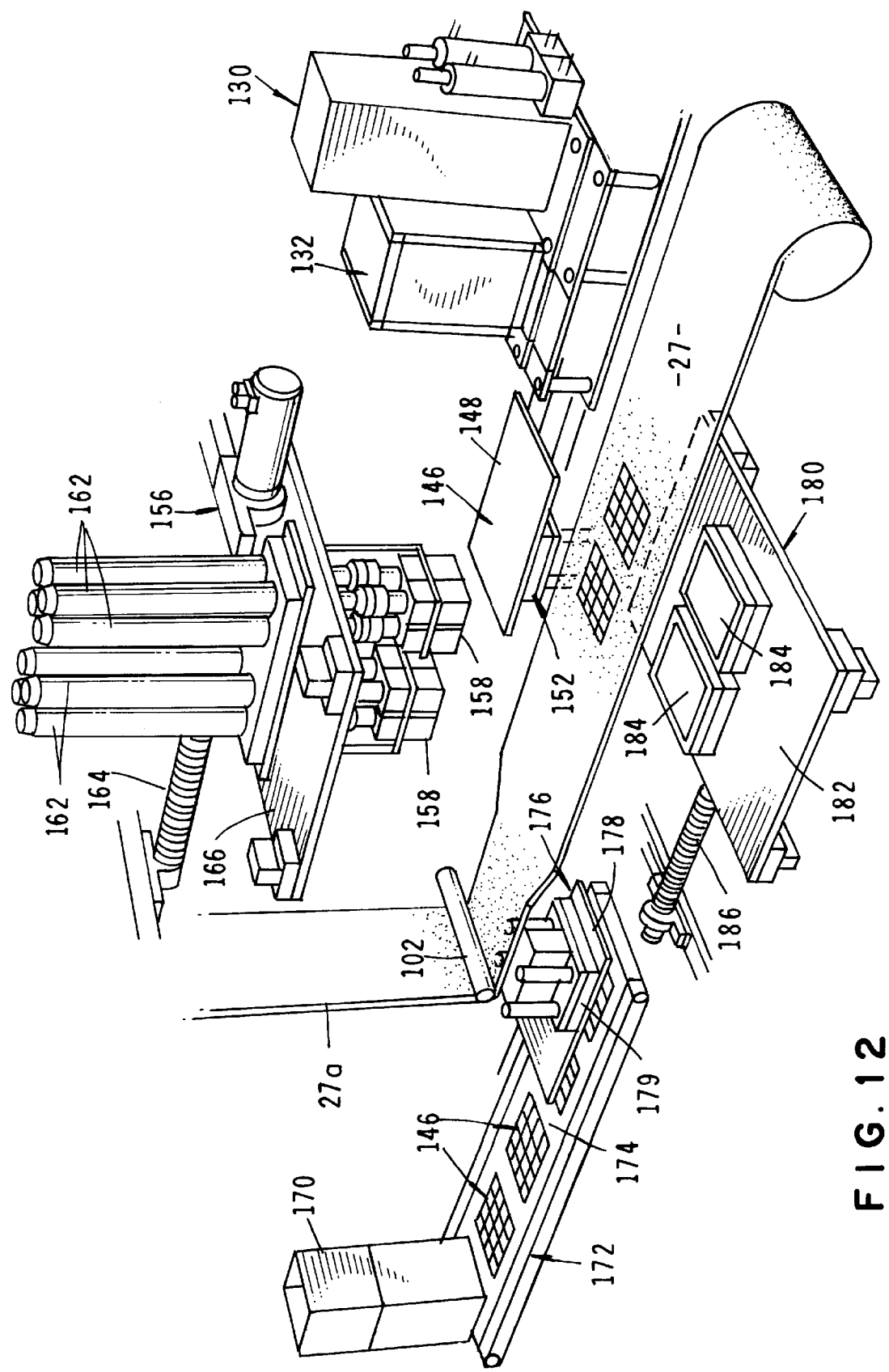
FIG. 12 is a generally diagrammatic, perspective view illustrating the position of the various subassemblies of the component assembly apparatus of the invention as they appear at the start of an assembly sequence.

The second positioning means of the invention, which functions to strategically position a plurality of base arrays 46 below the moving elastomeric membrane 27, here takes the form of a base array positioning assembly of the character best seen in FIGS. 5B and 11. Referring particularly to FIGS. 11 and 12, this important positioning assembly can be seen to comprise a lower base array input hopper 170 which is adapted to store and then sequentially dispense individual base arrays 46 of the character illustrated in FIG. 2. Also forming a part of the second positioning means of the invention is a conveyor assembly 172 which includes a conveyor belt 174 upon which the individual base arrays 46 are sequentially received from input hopper 170. As the base arrays are placed in tandam on belt 174 and are carried forwardly of the apparatus by belt 174, pairs thereof will be sequentially picked up by pick and place means, shown here as a novel pick up and place subassembly generally designated in FIG. 11 by the numeral 176. This pick and place assembly includes a vacuum operated capture plate 178 for picking up each pair of arrays and also includes pneumatic means 179 for controllably moving the capture plate longitudinally of the apparatus at the same rate of speed as the speed of travel of conveyor belt 174. With this construction, each of the pairs of base arrays 46 can be sequentially picked up from the conveyer 174 and expediciously transported to novel, centrally disposed lower walking beam shuttle means generally designated in FIG. 10 by the numeral 180. Shuttle means 180 includes a deck 182 which supports a pair of vertically movable base array support platforms 184. Deck 182 along with platform 184, is moved longitudinally of the apparatus by a conventional screw assembly generally designated in FIG. 10 by the numeral 186. In a manner presently to be described, after the base arrays have been positioned in tandem on the elevator platforms 184 of the central lower walking beam shuttle means, platform 182 will accelerate and then be moved synchronously with both membrane 27 as it travels forwardly of the apparatus and with the bonding means of the apparatus as it also travels forwardly of the apparatus at the same speed of travel as membrane 27. With this novel arrangement, when the cover components, which are carried by sonic bonding head assemblies 158 move into alignment with the base arrays, which are supported on platforms 184, the elevator platforms will be moved upwardly toward the lower surface of prestressed membrane 27. At precisely the same time, sonic bonding assemblies 158, along with the cover components 22 carried thereby, will move downwardly toward the upper surface of forwardly moving membrane 27. When the cover components, pressurally engage the upper surface of the membrane and the base components simultaneously pressurally engage the lower surface of the forwardly traveling membrane, the membrane 27 will be cut along a line defined by a circular-shaped protuberance 187 formed on base component 16 (FIG. 3). (See also Ser. No. 08/451,520). Simultaneously, the sonic bonding heads will be energized so as to sonically bond together the cover components and the base components with the portions of the prestressed membranes which are cut away being sealably captured therebetween. In this regard, protuberances 187, which are generally "V" shaped in cross section, not only cut the membrane, but also act as energy directors to facilitate the sonic bonding of the cover and base components.

Figure 13:
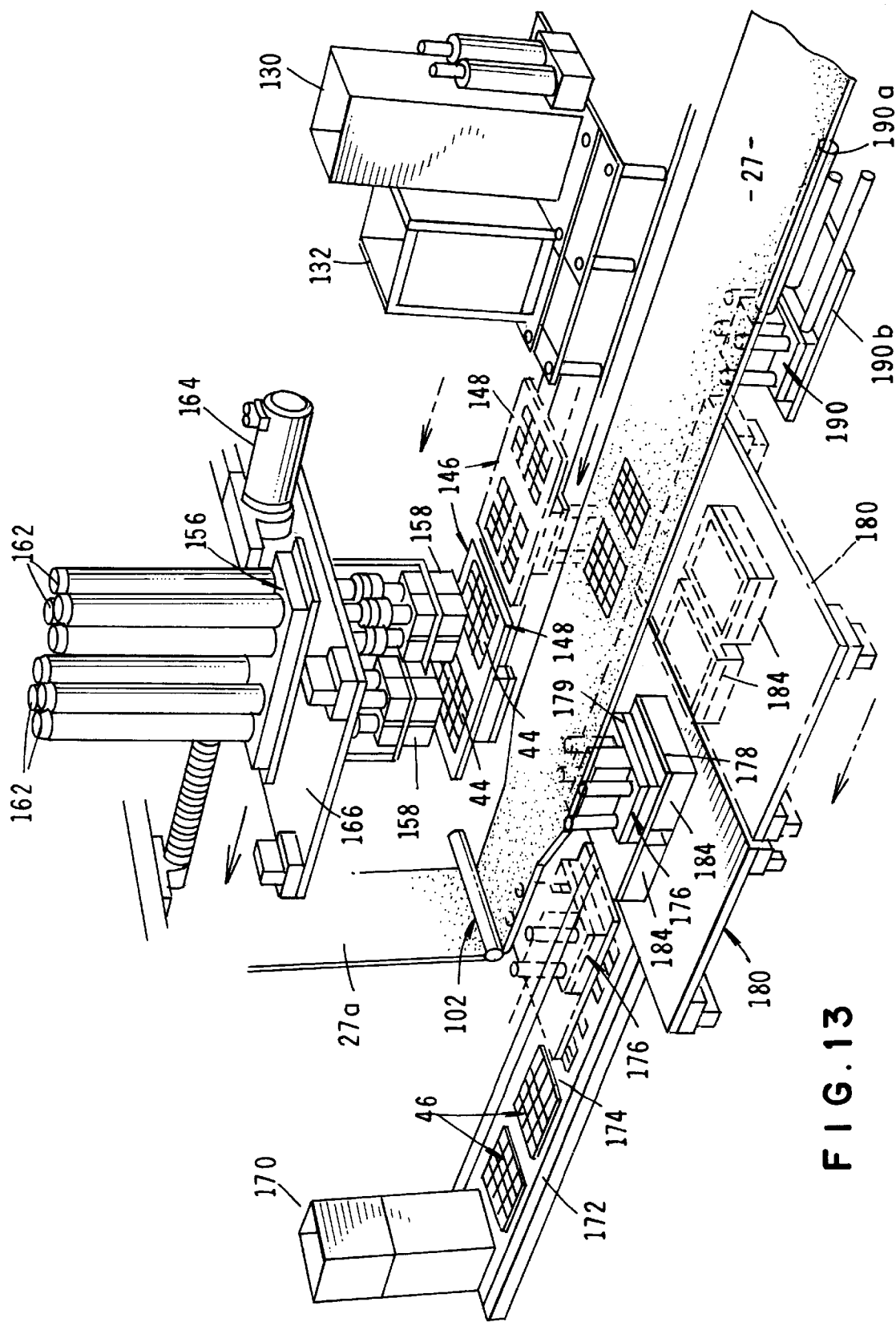
FIG. 13 is a generally schematic, perspective view similar to FIG. 12, but showing the position of the subassemblies as they appear at an interim step of the assembly process.

Accomplishment of the method of the invention for continuous assembly of the infusion devices 14 can be best understood by referring to FIGS. 12 through 15. Referring particularly to FIG. 12, the various cooperating mechanisms of the component assembly means of the invention are shown in a starting position at which the first step in the component assembly method of the invention can be commenced. More particularly, as shown in FIG. 12, shuttle plate 148 of the first positioning means of the invention is empty and ready to receive cover components from plate 142 of the sprue removal means. Similarly, the elevator platforms 184 of shuttle means 180 are empty and ready to receive base component arrays which have been dispensed from base array hopper 170 onto the surface of conveyor belt 174. Turning to FIG. 13, the phantom lines of this drawing show the cover components which have been transferred from transfer plate 142 to shuttle plate 148 by movement of table 137 to the left. The solid lines reflect the movement of platform 148 into a position directly below and in close proximity with sonic bonding head assemblies 158. With the cover components in this position, they are ready for capture by the vacuum capture means carried by the sonic bonding apparatus 158. The phantom lines in the lower left hand portion of FIG. 13 show the pickup and place subassembly 176 in position over a pair of base arrays which have been taken from hopper assembly 170 and positioned in tandem on conveyor belt 174. Also shown in phantom lines at the lower right of the FIG. 13 is the centrally disposed lower walking beam shuttle means of the invention with the previously assembled infusion devices 14 having been removed therefrom by the product removal shuttle or product pick up and place subassembly of the apparatus of the invention which is generally designated in FIG. 13 by the numeral 190. The solid lines in FIG. 13 show the central lower walking beam shuttle assembly 180 located in a position ready to receive the base arrays which have been picked up and transferred by the pickup and place subassembly 176, which is also shown in solid lines.

Figure 14:
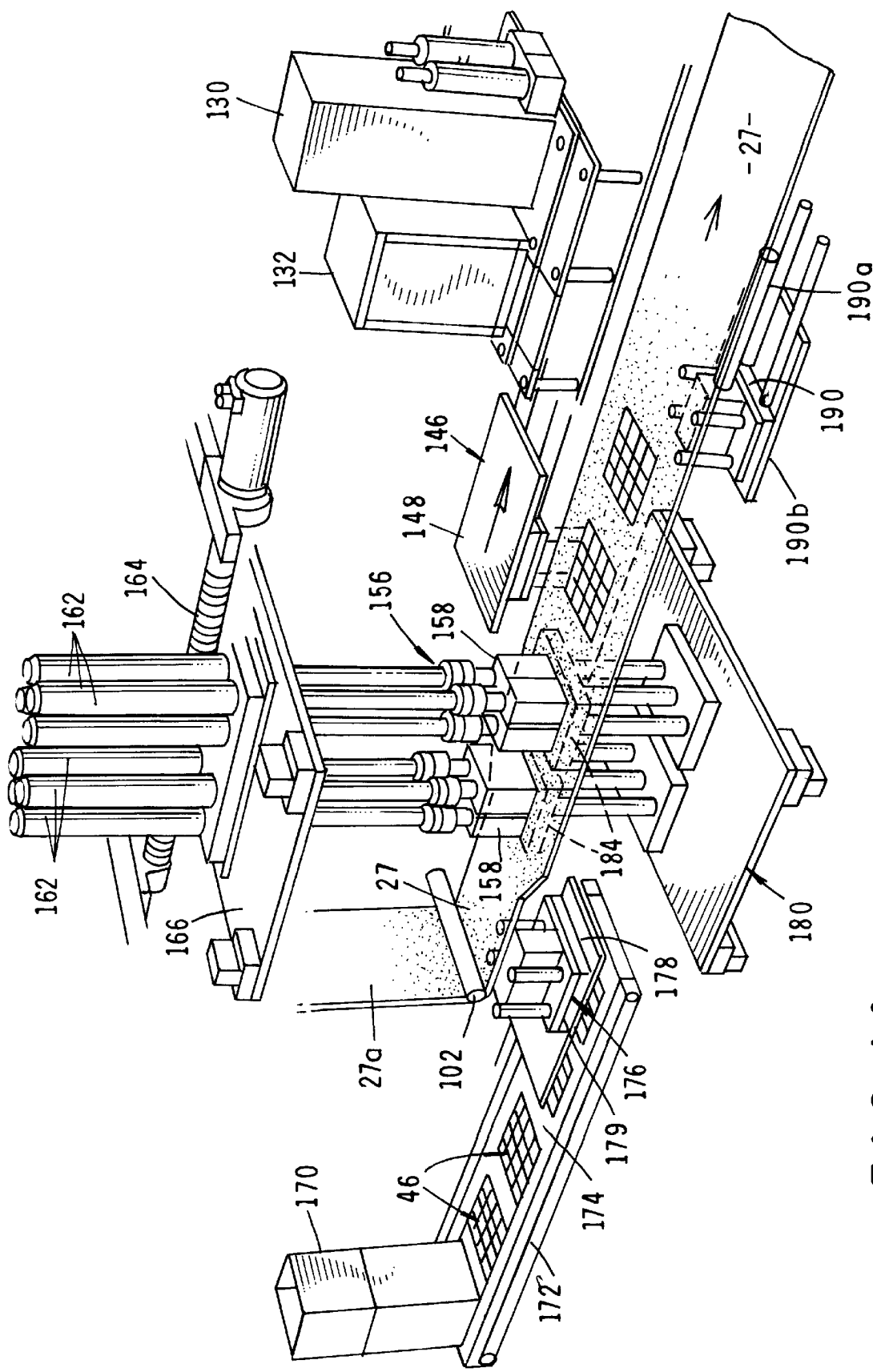
FIG. 14 is a generally diagrammatic, perspective view illustrating the position of the cooperating subassemblies of the apparatus during the bonding step wherein the cover components are bonded to the base components.

Turning to FIG. 14, the important sonic bonding step of the method is there illustrated. More particularly, the sonic bonding head assemblies 158 which carry the cover components are shown in a position in alignment with the base components carried by the elevator platforms 184 and moved upwardly into close proximity with the lower surface of membrane 27. It is to be noted that this step has been accomplished with the sonic bonding assemblies 158 and the elevator platforms 184 being first accelerated and then moved synchronously forwardly of the apparatus at the same rate of speed as and synchronously with membrane 27. As previously mentioned, as the cover components and the base components come into pressural engagement with the elastomeric membrane 27, the membrane will be cut along the circular shaped energy directors 187 provided on the upper surface of the base components. At this same instant in time, the base components and cover components will be bonded together with the cut portion of the membrane sealably captured therebetween.

Figure 15:
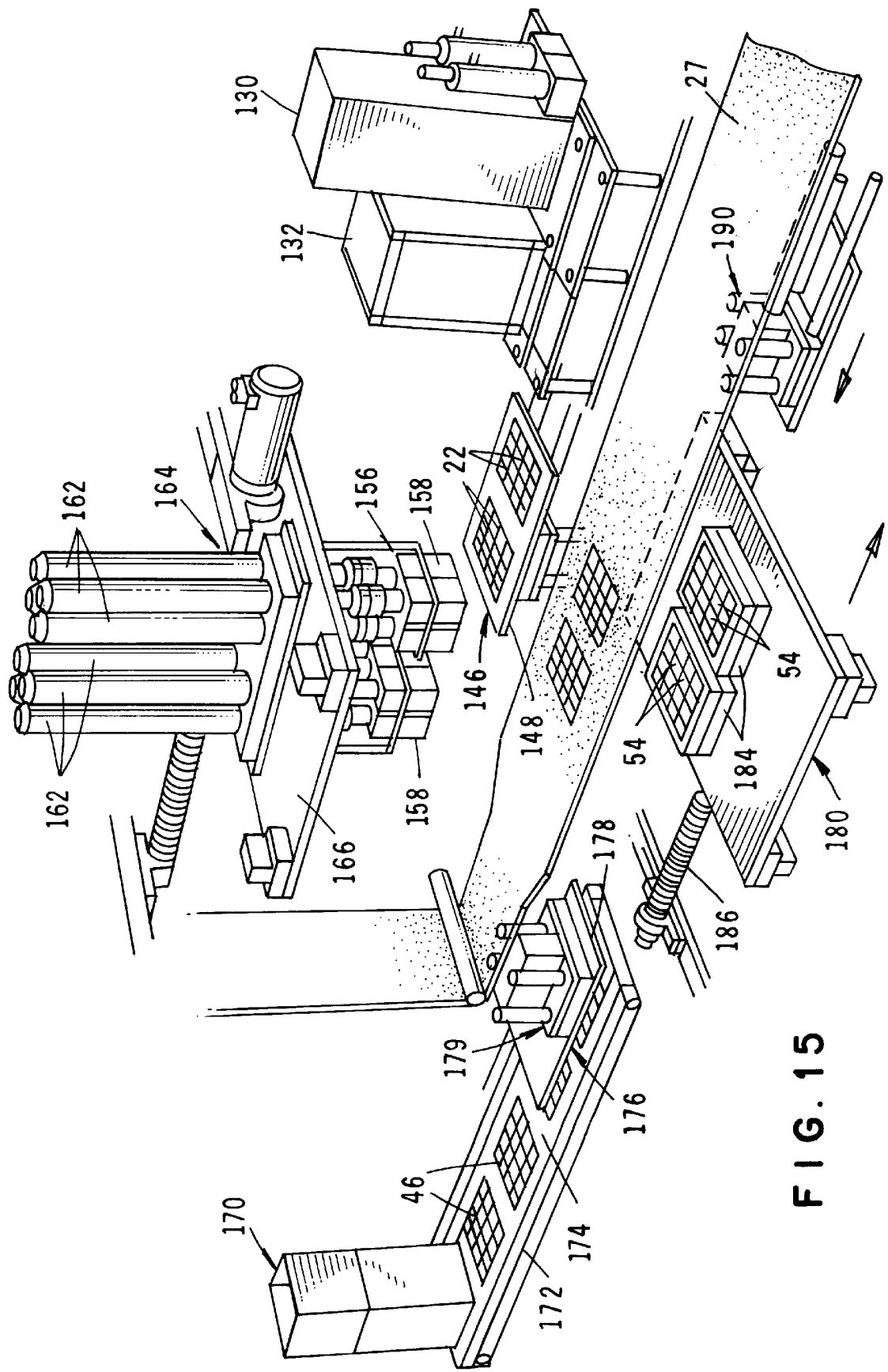
FIG. 15 is a generally diagrammatic, perspective view illustrating the position of the subassemblies of the apparatus following completion of the bonding step and prior to the commencement of the packaging operation.
Figure 16A:
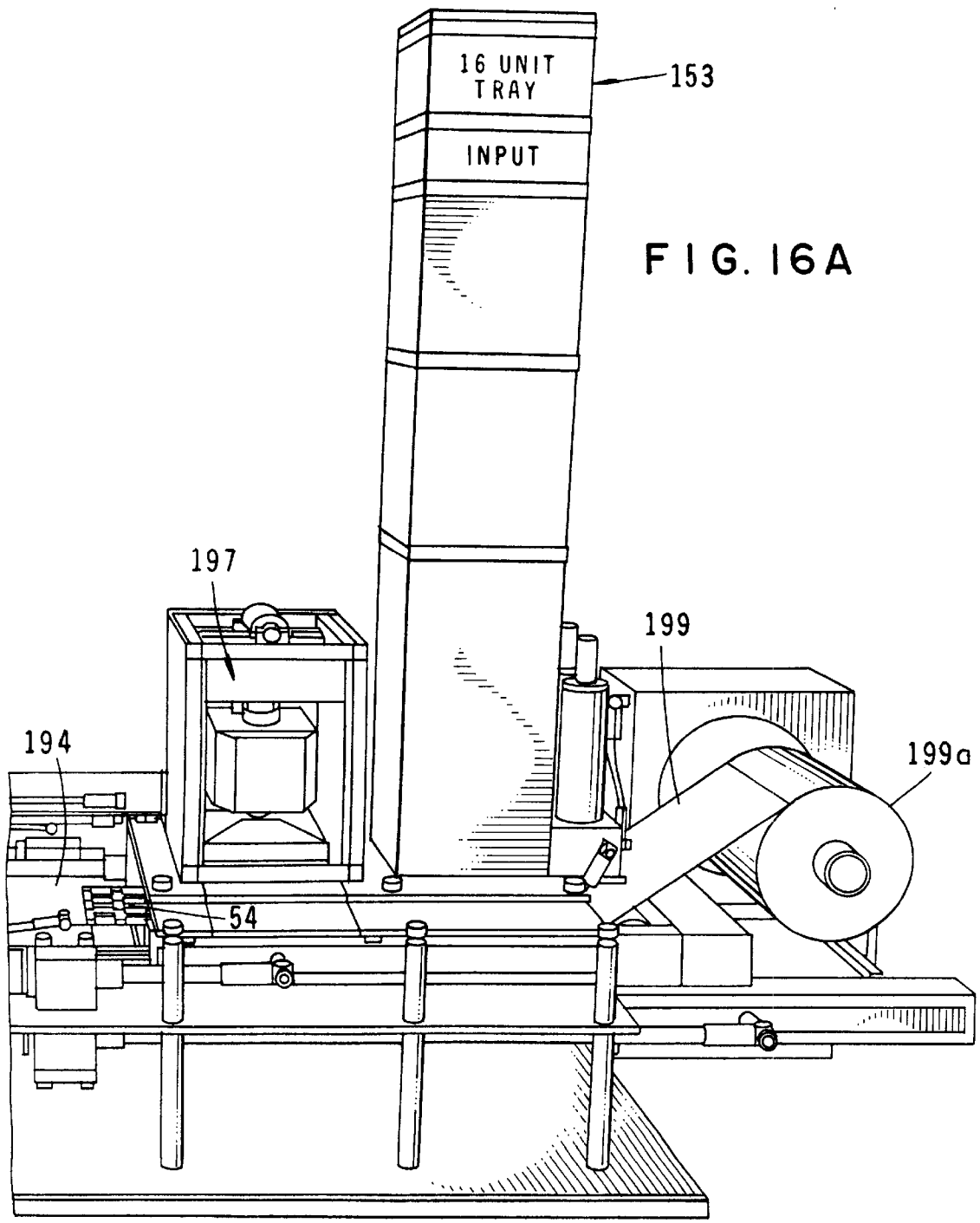

Turning to FIG. 15, which illustrates the post assembly position of the various components of the component assembly means, it is to be noted that the bonding head assemblies have once again been elevated to their original starting position shown in FIG. 12 and similarly, the elevator platforms 184 of the lower walking beam central shuttle means have been lowered to their original starting position shown in FIGS. 12 and 13. Disposed on the upper surfaces of the elevator platform 184 are the sealably interconnected device arrays 54 which are of the character shown in FIG. 3A. As indicated by the arrows in FIG. 15, during this post assembly step, the central shuttle means 180 is moving forwardly of the apparatus while the final product pickup and place assembly 190 is moving in the opposite direction due to the urging of pneumatic operating means 190a of conventional construction. This movement of the pickup and place assembly 190, as shown by the arrows of FIG. 15, will continue until the finished product arrays 54 disposed on platforms 184 are directly below the pickup and placement assembly 190. At this instant in time, the vacuum plate 190b of the pickup and placement assembly 190 will be lowered and the finished product arrays 54 will be captured. This done, travel of the final product pickup and placement assembly 190 will be reversed so that the final product arrays can be superimposed over and strategically placed upon a final product conveyor 194 of the character best seen in FIG. 16. As shown in FIG. 16, the final product arrays 54 are then carried by conveyor 194 to a final product lower base sprue removal station 197 (FIGS. 5C, 7C, and 16) where the sprues 50, which interconnect the assembled devices 14 are cut away. Following this sprue removal process, the finished components are transported to the final product packaging station where they are packaged for shipment and are removed from the apparatus (FIG. 16).

The sprue cutting operation, wherein sprues 50 are removed from the final product arrays, is accomplished by a sprue cutting apparatus of generally conventional construction. Similarly, the packaging step is accomplished using plastic thermo form tray packaging apparatus of a character well known to those skilled in the art which includes packaging the final product in the vacuum formed tray using a thermo sealing film material 199 which is dispensed from a roll of sealing material 199*a* (FIGS. 5C, 7C, and 16). Because these processes are well understood by those skilled in the art, the details of the final sprue removal process and of the packaging process will not be discussed in detail.

It is to be understood that the various operating subassemblies of the character described in the preceding paragraphs are controllably operated by the control means shown in FIGS. 5A, 6A and 7A and generally designated as 60.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of simultaneously producing a plurality of devices for infusing medicinal fluid into a patient at a controlled rate, each device having a base component provided with an upper surface including a central portion and a peripheral portion, a distendable, elastomeric membrane superimposed over the base component and a cover component engageable with the base, the method comprising the steps of:
   (a) forming a cover array comprising a plurality of spaced-apart cover components;
   (b) forming a base array comprising a plurality of spaced-apart base components;
   (c) removing a length of elastomeric membrane from a first roll of elastomeric membrane;
   (d) placing said cover array over said membrane at a location in alignment with said cover array in a manner such that each said base component of said base array is aligned with one of said cover components of said cover array; and
   (f) simultaneously sealably connecting together each said cover component with each said base component aligned therewith so that a portion of said elastomeric membrane is captured therebetween.

2. A method as defined in claim 1 including the further step of biaxially stretching said membrane after it is removed from said first roll of elastomeric membrane to form a length of prestressed membrane.

3. A method as defined in claim 2 including the further step of cutting said length of prestressed membrane as the cover component is emplaced over the base component.

4. A method as defined in claim 2 in which each said cover component is sealably connected by bonding to said base component aligned therewith.

5. A method as defined in claim 4 in which said cover component is sealably bonded to said aligned base component along the peripheral portion of the base component.

6. A method of making a plurality of devices for infusing medicinal fluid into a patient at a controlled rate, each said device having a base component provided with an upper surface including a central portion and a peripheral portion, a distendable, prestressed elastomeric membrane superimposed over the base component and a cover component engageable with the base, said method being accomplished using a manufacturing apparatus having first and second ends, support means disposed proximate the first end of the apparatus for rotatably supporting a rolled length of elastomeric membrane and membrane removal means for continuously removing the elastomeric membrane from the support means and for continuously moving said elastomeric membrane toward said second end of said apparatus at a first rate of speed, said method comprising the steps of:
   (a) positioning a plurality of cover components over the moving elastomeric membrane and moving said plurality of cover components synchronously with the elastomeric membrane in a direction toward the second end of the apparatus at the first rate of speed;
   (b) positioning a plurality of base components below the moving elastomeric membrane in alignment with the plurality of cover components and moving the base components synchronously with the elastomeric membrane in a direction toward the second end of the apparatus at the first rate of speed; and
   (c) sealably interconnecting each of the plurality of cover components with a selected one of said plurality of base components with a portion of the elastomeric membrane disposed therebetween to form a plurality of devices.

7. A method as defined in claim 6 including the further step of biaxially stretching the moving elastomeric membrane to form a prestressed membrane.

8. A method as defined in claim 7 including the further step of cutting said prestressed membrane as the cover components are sealably interconnected with the base components.

9. A method as defined in claim 8 in which each cover component is connected to a base component by bonding.

* * * * *